United States Patent
Weir et al.

(10) Patent No.: US 12,251,615 B2
(45) Date of Patent: *Mar. 18, 2025

(54) DEPLOYABLE SLACKLINE

(71) Applicant: Royal Caribbean Cruises Ltd., Miami, FL (US)

(72) Inventors: Nicholas Weir, Davie, FL (US); Steven Michelman, Las Vegas, NV (US); Zachary Cook, Las Vegas, NV (US); Joseph William Champelli, Louisville, KY (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,797

(22) Filed: Sep. 21, 2023

(65) Prior Publication Data

US 2024/0009500 A1    Jan. 11, 2024

Related U.S. Application Data

(63) Continuation of application No. 17/930,903, filed on Sep. 9, 2022, now Pat. No. 11,766,583.
(Continued)

(51) Int. Cl.
*A63B 7/08* (2006.01)

(52) U.S. Cl.
CPC .................. *A63B 7/085* (2013.01)

(58) Field of Classification Search
CPC . A63B 7/085; A63B 2210/50; A63B 2225/50; A63B 2225/72; G01L 5/04; F16G 11/12
See application file for complete search history.

(56) References Cited

U.S. PATENT DOCUMENTS 1,419,191 A * 6/1922 Acker ............... A63B 7/08
                                          313/325
3,754,757 A * 8/1973 Bowen ............. A63B 7/08
                                          482/34
(Continued)

FOREIGN PATENT DOCUMENTS

DE    20 2011 100 926       9/2011
DE    2020 221 02793 U1     7/2022
(Continued)

OTHER PUBLICATIONS

PCT Search Report and Written Opinion (PCT/US2022/076231), Nov. 30, 2022, 10 pages.

*Primary Examiner* — Megan Anderson
*Assistant Examiner* — Andrew M Kobylarz
(74) *Attorney, Agent, or Firm* — Knobbe, Martens, Olson & Bear LLP

(57) ABSTRACT

Deployable slackline systems are disclosed which can support a slackline at a desired height and nominal tension. The disclosed systems may maintain one or more slacklines and can adjust height and tension of individual slacklines while the slacklines are in use. The disclosed slackline systems are stowable; tensioning and termination assemblies of the slackline system can each fold into a compact housing having a height substantially less than a vertical range of motion of the slackline. The disclosed slackline systems can be implemented in aquatic or non-aquatic performance environments such as on cruise ships or other hospitality settings.

23 Claims, 15 Drawing Sheets

Related U.S. Application Data

(60) Provisional application No. 63/261,100, filed on Sep. 10, 2021.

(56) References Cited

U.S. PATENT DOCUMENTS

| | | | |
|---|---|---|---|
| 10,092,788 B2 * | 10/2018 | O'Brien | F16B 45/027 |
| 10,456,626 B2 | 10/2019 | Groshek | |
| 2012/0238421 A1 * | 9/2012 | Klopman | A63B 7/085 |
| | | | 482/142 |
| 2015/0157890 A1 * | 6/2015 | Klopman | A63B 7/085 |
| | | | 482/142 |
| 2016/0245503 A1 * | 8/2016 | Benedict | F21V 33/008 |
| 2016/0325130 A1 * | 11/2016 | Grund | A63B 7/085 |
| 2017/0291065 A1 * | 10/2017 | Klopman | G06F 3/013 |

FOREIGN PATENT DOCUMENTS

| | | |
|---|---|---|
| EP | 2 886 166 A1 | 6/2015 |
| ES | 1 141 612 U | 7/2015 |

* cited by examiner

DEPLOYABLE SLACKLINE

CROSS-REFERENCE TO RELATED APPLICATIONS

This application is a continuation of U.S. application Ser. No. 17/930,903, filed Sep. 9, 2022, titled "DEPLOYABLE SLACKLINE," which claims the benefit of U.S. Provisional Application Ser. No. 63/261,100, filed Sep. 10, 2021, titled "DEPLOYABLE SLACKLINE WITH AUTOMATIC TENSIONING," both of which are incorporated by reference herein in their entirety.

FIELD

The present application relates to deployable support systems capable of supporting a slackline at a selectable height and tension.

BACKGROUND

Slacklining refers to the act of walking, running, balancing, jumping, etc., along a slackline and is increasingly popular as an indoor or outdoor activity. A slackline generally refers to a length of line, such as a flat webbing, suspended between two anchors. A variety of acrobatic tricks may also be performed on slacklines, a practice also referred to as tricklining. Tricklining may be incorporated into the performing arts such as contemporary circus or other performances. Conventional slacklines are statically fixed to anchor points, such as poles, trees, or the like, and are not capable of repositioning (for example, changing height) or tension adjustment other than by manual adjustment of the slackline webbing and the ratchets affixing the slackline to the anchors.

SUMMARY

The systems and methods of this disclosure each have several innovative aspects, no single one of which is solely responsible for its desirable attributes. Without limiting the scope as expressed by the claims that follow, its more prominent features will now be discussed briefly.

In a first aspect, a deployable slackline system comprises a tensioning assembly, a termination assembly, and control circuitry. The tensioning assembly includes a tensioning assembly post having a distal end configured to support a first end of a suspended portion of a slackline; and a first actuator configured to move the tensioning assembly post to adjust a height of the distal end of the tensioning assembly post. The termination assembly comprises a termination assembly post having a distal end configured to support a second end of the suspended portion of the slackline opposite the first end; and a second actuator configured to move the termination assembly post to adjust a height of the distal end of the termination assembly post. The control circuitry is in communication with the first actuator and the second actuator, and is configured to cause movement of the tensioning assembly post and the termination assembly post in synchronization to selectively raise and lower the suspended portion of the slackline while maintaining a nominal tension on the suspended portion of the slackline.

In some embodiments, the tensioning assembly further comprises a tensioning motor coupled to the tensioning assembly post, the tensioning motor configured to rotate a slackline spool to selectively take in and let out slackline to adjust the nominal tension of the suspended portion of the slackline. In some embodiments, the distal end of the tensioning assembly post comprises an end roller that supports the first end of the suspended portion of the slackline, and the slackline extends from the slackline spool around the end roller to the termination assembly post. In some embodiments, the suspended portion of the slackline spans at least a portion of a pool and, when the deployable slackline is in a stowed configuration, the tensioning motor is configured to let out a length of slackline such that the suspended portion of the slackline is disposed below a water level of the pool. In some embodiments, the deployable slackline system further comprises a secondary brake configured to stop rotation of the slackline spool in response to a failure of the tensioning motor.

In some embodiments, the distal end of the termination assembly post comprises a termination pin connected directly or indirectly to the second end of the suspended portion of the slackline.

In some embodiments, the termination pin comprises a sensor in communication with the control circuitry and configured to measure a current tension of the suspended portion of the slackline. In some embodiments, the control circuitry is further configured to adjust the nominal tension of the suspended portion of the slackline based at least in part on tension measurements received from the sensor. In some embodiments, the control circuitry is further configured to selectively allow the current tension to exceed the nominal tension without adjustment while the slackline is in use.

In some embodiments, at least one of the tensioning assembly and the termination assembly comprises a float sensor in communication with the processing circuitry and configured to send a signal to the processing circuitry when the float sensor is at least partially submerged in a liquid, wherein the signal causes the processing circuitry to inhibit operation of at least one of the first actuator and the second actuator.

In some embodiments, at least one of the tensioning assembly and the termination assembly comprises a housing having a lid comprising a walking surface thereon. In some embodiments, the lid is contiguous with a surrounding static walking surface when the deployable slackline system is in a stowed configuration. In some embodiments, the lid is a termination assembly lid fixedly coupled to the termination assembly post. In some embodiments, the termination assembly lid at least partially shields the termination assembly post from contact while the termination assembly is in a deployed configuration. In some embodiments, the walking surface comprises a rubberized or textured walking surface.

In some embodiments, the deployable slackline system further comprises a second tensioning assembly and a second termination assembly supporting a second slackline, wherein the control circuitry is further configured to independently adjust heights of the slackline and the second slackline.

In some embodiments, the deployable slackline system further comprises a user control device in communication with the control circuitry, wherein the control circuitry is configured to selectively raise and lower the suspended portion of the slackline in response to user inputs received at the user control device.

In some embodiments, the tensioning assembly post is connected to the first actuator by a first mechanical linkage and wherein the termination assembly post is connected to the second actuator by a second mechanical linkage, the first and second actuators being configured to move the tensioning assembly post and the termination assembly post in parallel motion. In some embodiments, the first and second actuators are linear actuators, and wherein the parallel motion of the tensioning assembly post and the termination assembly post comprises a combination of linear and rotational motion.

In some embodiments, the termination assembly further comprises a housing that encloses the termination assembly post while the termination assembly is in a stowed configuration, and the housing has a height smaller than a maximum vertical range of motion of the distal end of the termination assembly post.

In some embodiments, the tensioning assembly further comprises a housing that encloses the tensioning assembly post while the tensioning assembly is in a stowed configuration, wherein the housing has a height smaller than a maximum vertical range of motion of the distal end of the tensioning assembly post.

DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
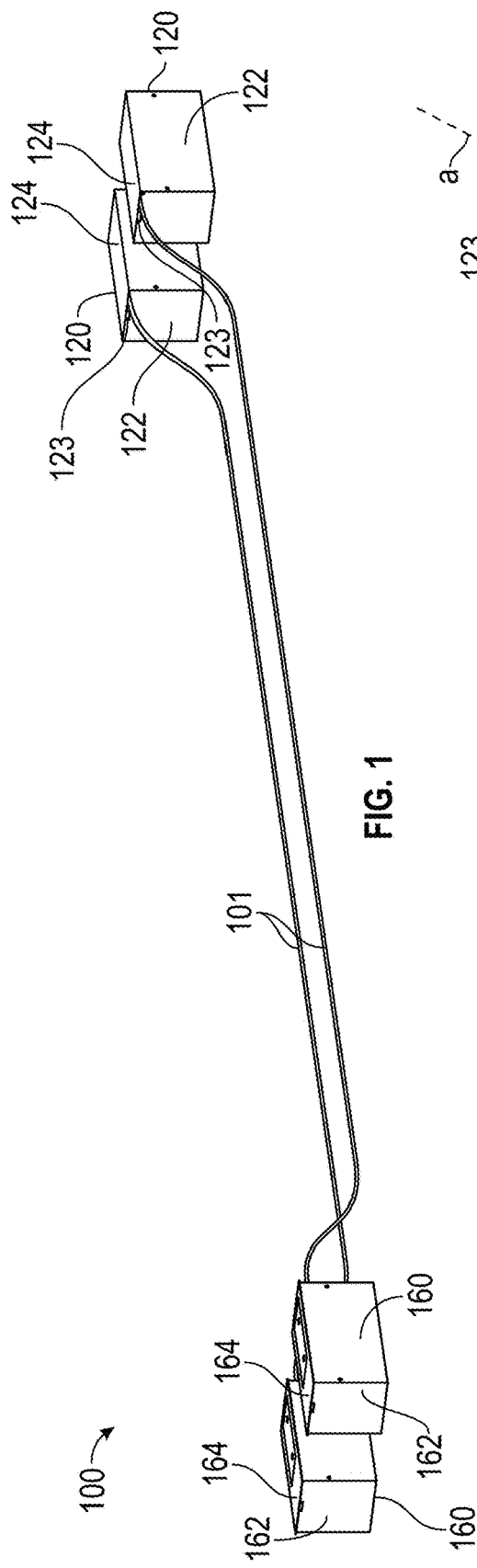
FIG. 1 illustrates an example system of two deployable slacklines in a stowed configuration in accordance with the present technology.

The present disclosure provides slackline support systems and methods that have a number of advantages relative to conventional slackline equipment. For example, the presently disclosed systems and methods can support a slackline at a selectable height which may be adjusted before, during, and/or after use of the slackline, including while a user's weight is on the slackline. In contrast, existing slacklines do not accommodate height or tension adjustment other than by manually changing the height or tension, which cannot practically be performed while the slackline is in use. In some implementations, this adjustable height may be used to create striking visual effects when one or more slackline systems are used by performers in front of an audience. In one particular example, two or more parallel or non-parallel slackline systems may be adjusted independently such that the relative heights of performers on the multiple slacklines can be varied. In another example, in the case of aquatic performances where one or more slacklines are suspended over a pool, the height of the slackline can be adjusted such that a performer appears to stand, walk, run, or jump on the surface of the water.

In addition, the slackline systems can be stowable while not in use. For example, during a show such as a contemporary circus performance or other multi-disciplinary performance, there may be portions of the show that do not include slacklining. During such portions, or before or after the show, it may be desirable to stow the slackline in a configuration in which the slackline and its anchors do not obstruct movement of other performers, crew, or audience members. Stowage of the slackline can also provide an aesthetic benefit as audience members and/or others present in a performance space may not be able to see the slackline systems when stowed, which may be especially advantageous in the context of a performance that includes a number of components other than slackline performance. Moreover, stowing components of a slackline system can protect those components from damage and/or corrosion from salt air and/or pool water. As will be described in greater detail, embodiments of the present slackline systems can be selectively deployed and stowed.

The slackline systems of the present disclosure can also be configured to automatically select and/or maintain a desired tension. The tension of a slackline is generally lower than the tension used for other rope or wire walking disciplines, and a particular tension or tension range may be desirable for a particular slackline performance or performer. Conventionally, adjustment and maintenance of slackline tension has required manual adjustment of a ratchet or other structure affixing a slackline to an anchor point. As will be described in greater detail, embodiments of the present slackline systems are capable of automatic motor-implemented adjustment and maintenance of a desired tension.

Example slackline systems of the present technology will now be described with reference to the figures. Although the following disclosure will refer primarily to slacklines comprising flat webbing and with reference to implementations in an aquatic performance environment, the present technology is not limited to such contexts. It will be understood that the systems of the present technology can equally be implemented in conjunction with differing tensions and with other types of suspended material, such as in the contexts of slack rope walking, tightrope walking (e.g., funambulism), or any other type of rope, line, or wire walking materials and tensions. In addition, the systems of the present technology can also be implemented in other types of performance spaces such as non-aquatic environments, as well as in non-performance contexts such as rehearsal studios for performers and/or private environments for use by non-performers.

The tension of a slackline may fluctuate significantly during use by a performer. For example, when a slackline is not in use or while a performer is not in contact with the slackline (e.g., in the air), the slackline experiences a nominal tension across the suspended portion of the slackline between endpoints. While a performer is standing on the slackline, the slackline experiences a tension higher than the nominal tension due to the additional weight of the performer on the line. When a performer jumps from or lands on the slackline, an even higher tension may be present in the slackline due to the additional downward force exerted by jumping or landing. Throughout the present disclosure, the term "nominal tension" refers to the tension measured on an unweighted slackline. Accordingly, a consistent "nominal tension" may be maintained by fixing the position of two ends of a slackline, although the actual tension on the line may fluctuate due to activity on the slackline while the nominal tension is maintained.

Figure 2:
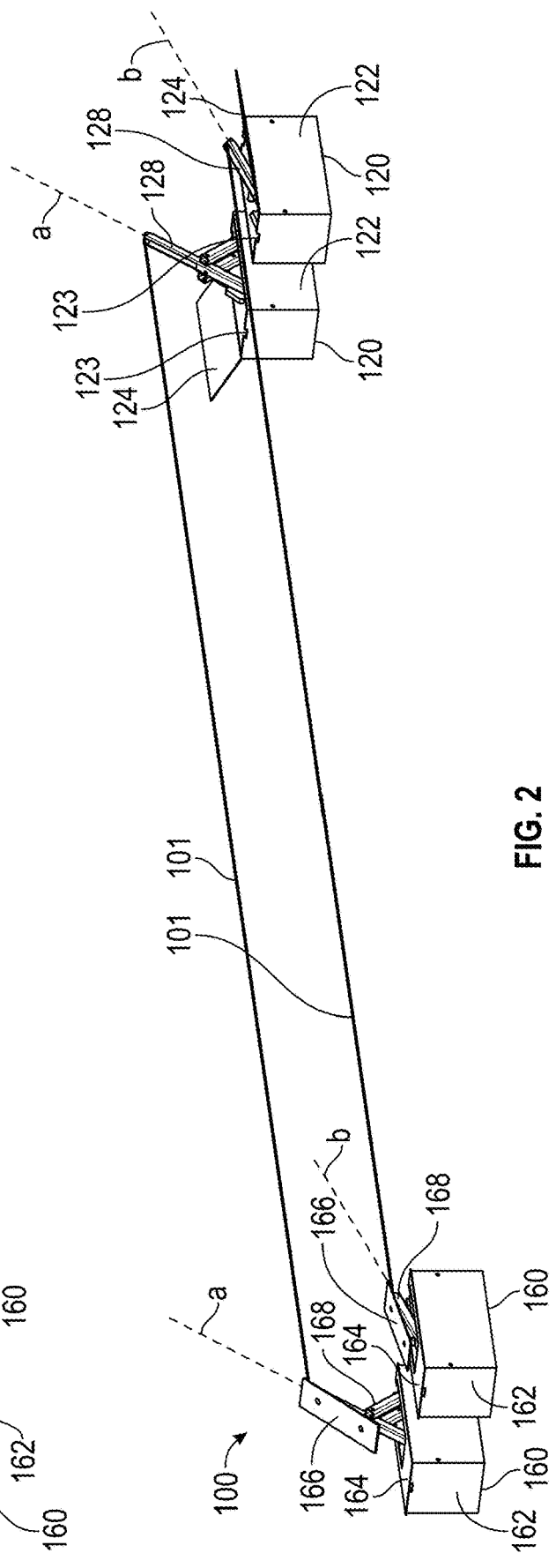
FIG. 2 illustrates the example deployable slackline system of FIG. 1 in a deployed configuration.

FIGS. 1 and 2 illustrate an example slackline system 100 in accordance with the present technology. FIG. 1 depicts the system 100 in a stowed or untensioned configuration; FIG. 2 depicts the system 100 in a deployed or tensioned configuration. The system of FIGS. 1 and 2 includes two slacklines 101, although the present technology may equally be implemented with a single slackline 101 or three or more slacklines 101, without departing from the scope of the present disclosure. The suspended portion of each slackline 101 is supported at opposing ends by a tensioning assembly 120 at a first end and by a termination assembly 160 at a second end opposite the first end. In some embodiments, the suspended portion of a slackline 101 may include all or less than all of the full length of a section of webbing (e.g., a flat webbing) that makes up the slackline. For example, one or both ends of the section of webbing may terminate at a location between the tensioning assembly 120 and the termination assembly 160, and may be affixed to a rope, wire, or other type of line connecting the end of the webbing to the corresponding termination or tensioning assembly.

Each tensioning assembly 120 includes a housing 122 and a lid 124 which at least partially enclose an interior volume of the tensioning assembly 120. A first end of a slackline 101 can be retained within the interior volume. A notch 123 can be present at an upper end of the housing 122 to accommodate the material of the slackline 101 therethrough while the tensioning assembly 120 is in the stowed configuration. Beginning from the stowed configuration of FIG. 1, the tensioning assembly 120 can move to the deployed configuration of FIG. 2 by opening the lid 124 (e.g., under control of a motor or manually) and extending a tensioning assembly post 128 upward out of the housing 122 to a desired height such that a top end of the tensioning assembly post 128 defines a tensioning end of the suspended or tensioned portion of the slackline 101. Operation and internal components of the tensioning assembly 120 will be described in greater detail with reference to FIGS. 6-10. In some embodiments, tensioning assemblies 120 may be implemented with only a partial housing and/or lid, or without a housing and/or lid.

Each termination assembly 160 includes a housing 162 having a top surface 164 at least partially enclosing an interior volume of the termination assembly 160. At least a portion of the top surface 164 can be a movable lid 166, which may be coupled to an extendable termination assembly post 168. Beginning from the stowed configuration of FIG. 1, the termination assembly 160 can move the deployed configuration of FIG. 2 by extending the termination assembly post 168 and the attached lid 166 upward away from the housing 122 to a desired height such that a top end of the termination assembly post 168 defines a termination end of the suspended or tensioned portion of the slackline 101. In some embodiments, deployment, stowage, and/or height adjustment of the termination assembly 160 can be synchronized with a corresponding deployment, stowage, and/or height adjustment of the corresponding tensioning assembly, under control of control circuitry in communication with both assemblies of the system. Computer-implemented monitoring and control functions of the disclosed slackline systems will be described in greater detail with reference to FIG. 17. Operation and internal components of the termination assembly 160 will be described in greater detail with reference to FIGS. 11-15. In some embodiments, termination assemblies 160 may be implemented with only a partial housing and/or lid, or without a housing and/or lid.

In some embodiments, the tensioning assembly post 128 and termination assembly post 168 of each individual slackline 101 can be configured to remain parallel or substantially parallel, and/or to move in parallel motion, while raising and lowering the slackline 101 and/or at any deployed height, as indicated by dashed lines a and b in FIG. 2 aligned with longitudinal axes of the tensioning assembly posts 128 and termination assembly posts 168. This parallel arrangement can provide substantially better stability of tension and lateral positioning while the slackline 101 is raised and lowered. For example, this configuration can prevent an increase or decrease in tension that may occur due to raising or lowering the slackline 101 if either the tensioning assembly 120 or the termination assembly 160 were rotated 180 degrees about a vertical axis to a symmetrically opposed (rather than parallel) configuration. Accordingly, embodiments of the present disclosure can move the tensioning assembly post 128 and the termination assembly post 168 in synchronization to selectively raise and lower the suspended portion of the slackline 101 while maintaining a nominal tension on the suspended portion of the slackline 101. For example, the tensioning assembly post 128 and the termination assembly post 168 can move at the same time and/or at the same rate to raise and lower the suspended portion of the slackline 101.

Figure 3:
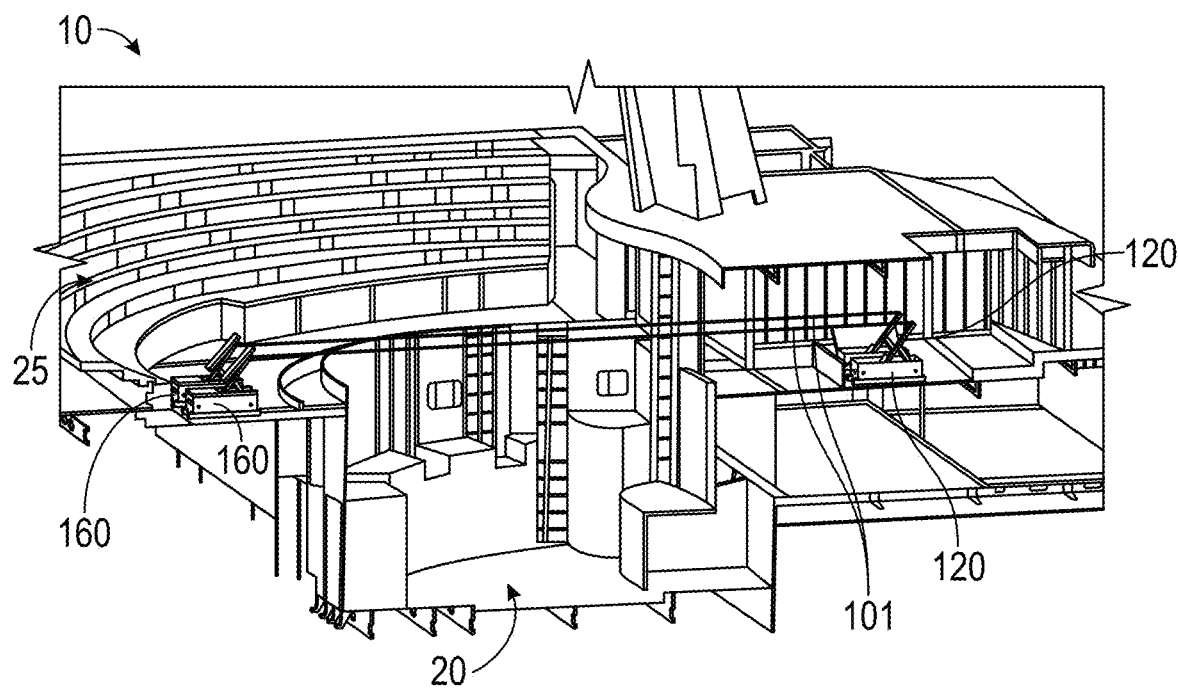
FIGS. 3-5 illustrate the example deployable slackline system of FIG. 1 installed in an example performance environment.
Figure 4:
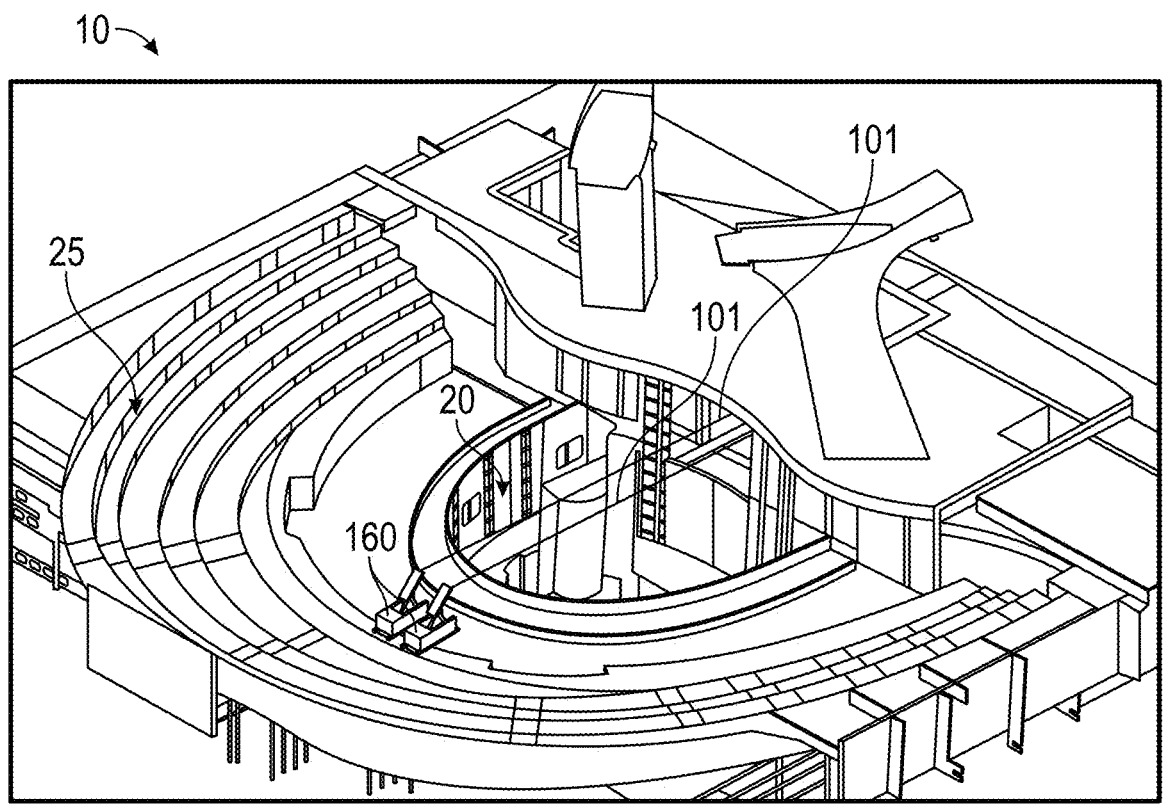
Figure 5:
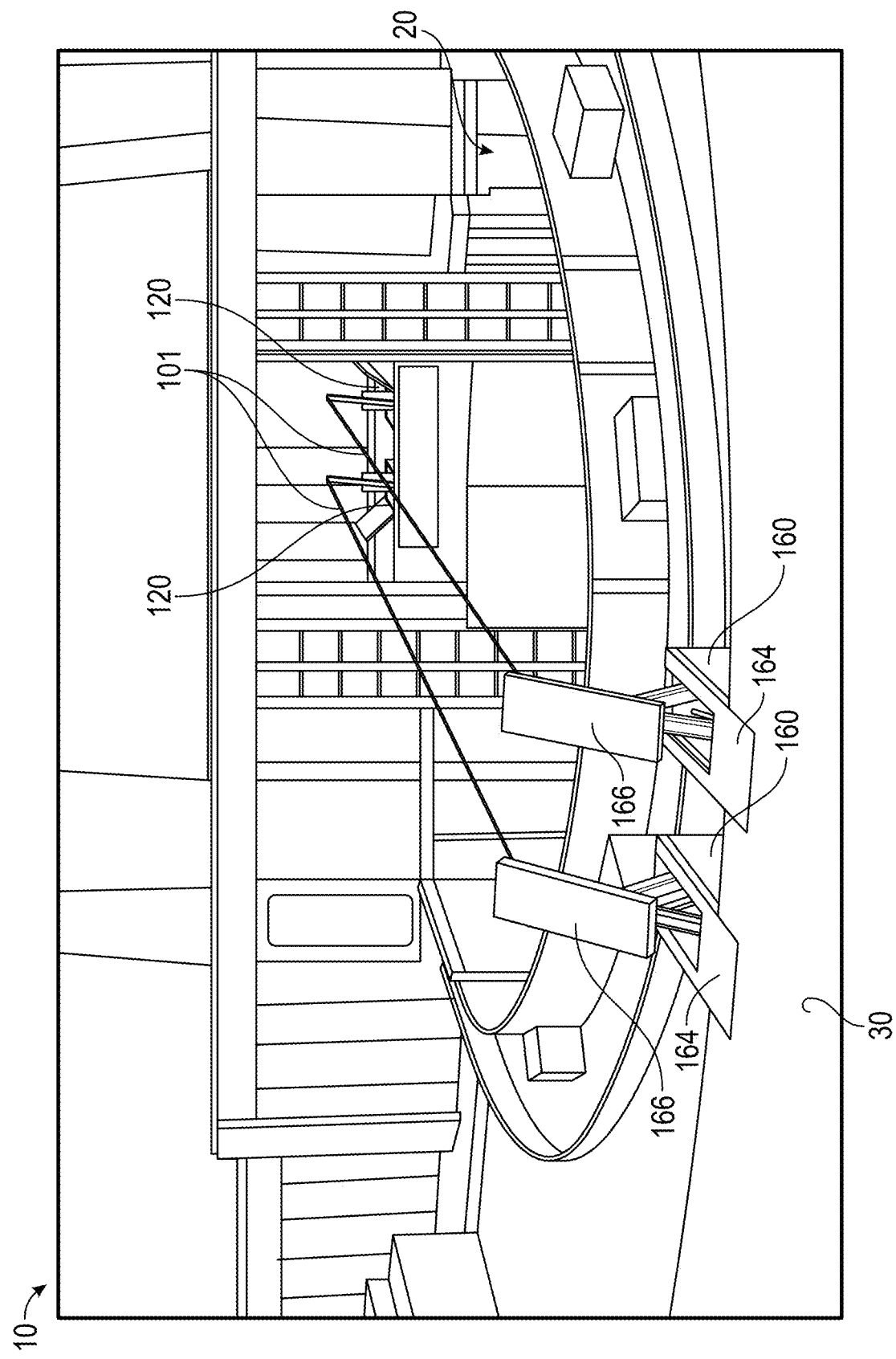

FIGS. 3-5 illustrate the deployable slackline system of FIG. 1 installed in an example performance environment 10. In some implementations, such as in the non-limiting example performance environment 10 illustrated in FIGS. 3-5, the deployable slackline system may be installed in an aquatic performance environment including a pool 20. One or more tensioning posts 120 can be installed at a first end of the pool 20 and one or more corresponding termination posts 160 can be installed at a second end of the pool 20 opposite the first end, such that the one or more slacklines 101 are suspended across the pool 20. In alternative implementations, the disclosed slackline systems can be installed over any other type of performance space rather than a pool 20, for example, a floor, a stage, open air, or a non-water shock-absorbing or resilient structure such as a foam pit or ball pit, a trampoline, an inflatable air cushion, etc. The performance environment 10 may be located in a variety of settings, such as in a theater, on a cruise ship or other hospitality setting, or the like.

In some embodiments, the performance environment 10 may include an audience seating area 25 which may be in close proximity to the location where the tensioning assemblies 120 and/or the termination assemblies 160 are installed. As shown in FIG. 5, each termination assembly 160 and/or tensioning assembly 120 may be installed adjacent to a walking surface 30 on which performers may walk and/or audience members may walk before, during, and/or after a performance. Accordingly, the top surface 164 and lid 166 of the termination assembly 160 and/or the lid 124 of the tensioning assembly 120 can be made from or coated with a suitable material to form a walkable surface while in the stowed configuration. Moreover, while in the deployed configuration as shown in FIG. 5, the lid 166 of each termination assembly 160 can serve as a shield to prevent inadvertent contact with the internal components of the termination assembly 160. In some embodiments, the locations of the tensioning assemblies 120 and the termination assemblies 160 can be swapped in the example performance environment of FIGS. 3-5.

Figure 6:
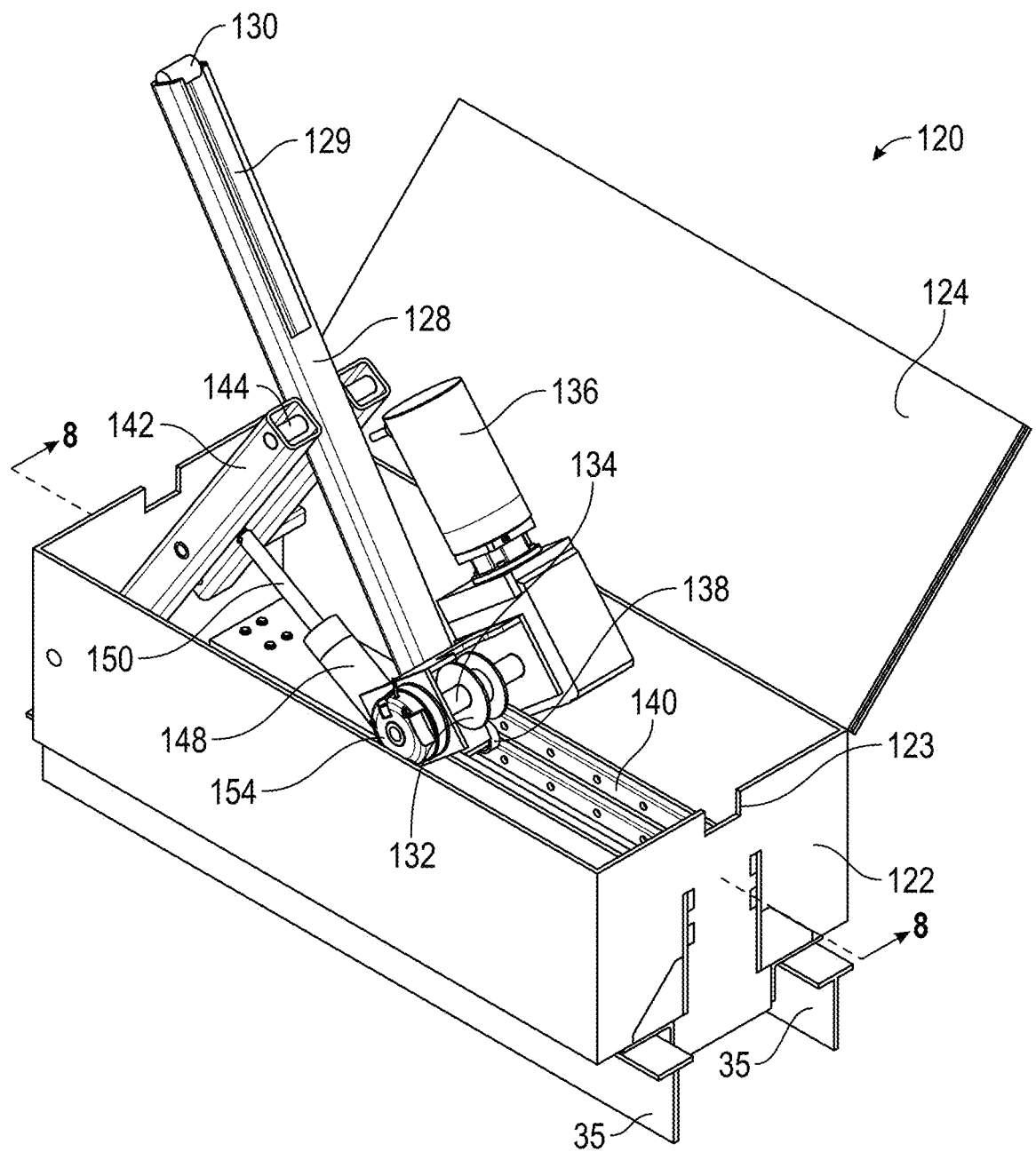
FIGS. 6-10 illustrate an example tensioning assembly of a deployable slackline system in accordance with the present technology.
Figure 7:
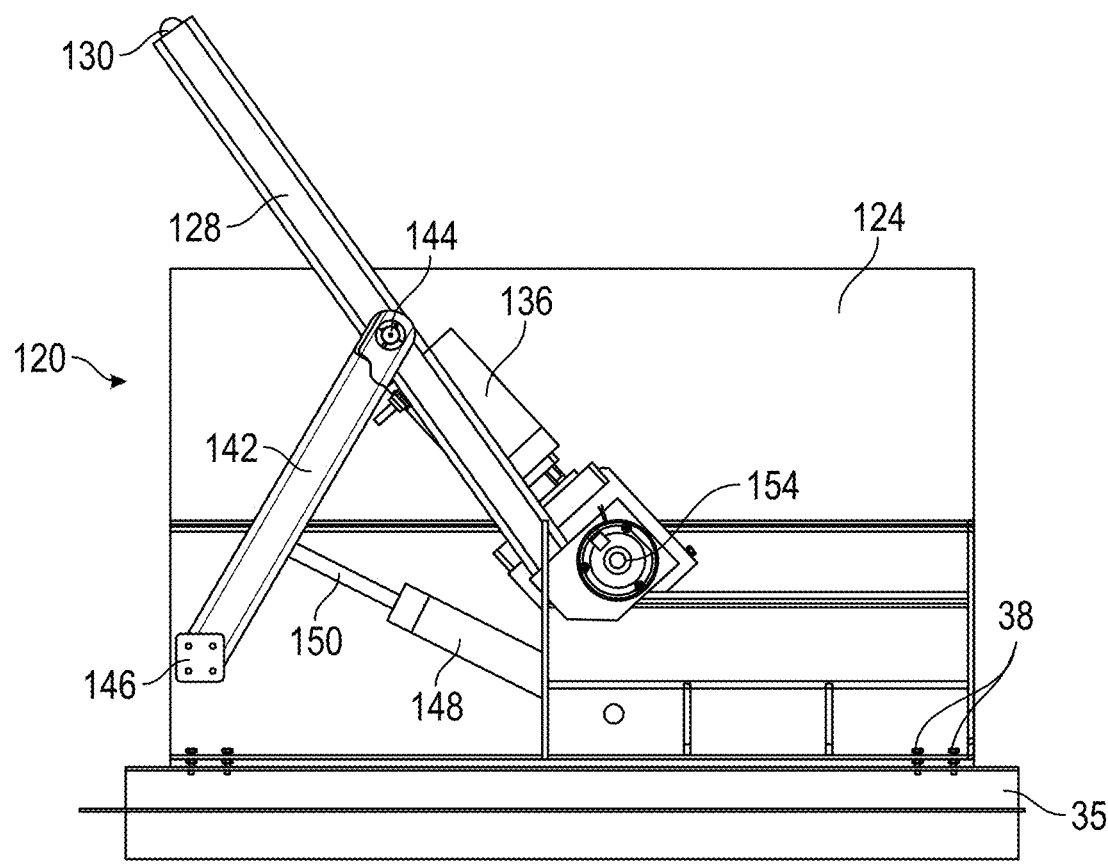
Figure 8:
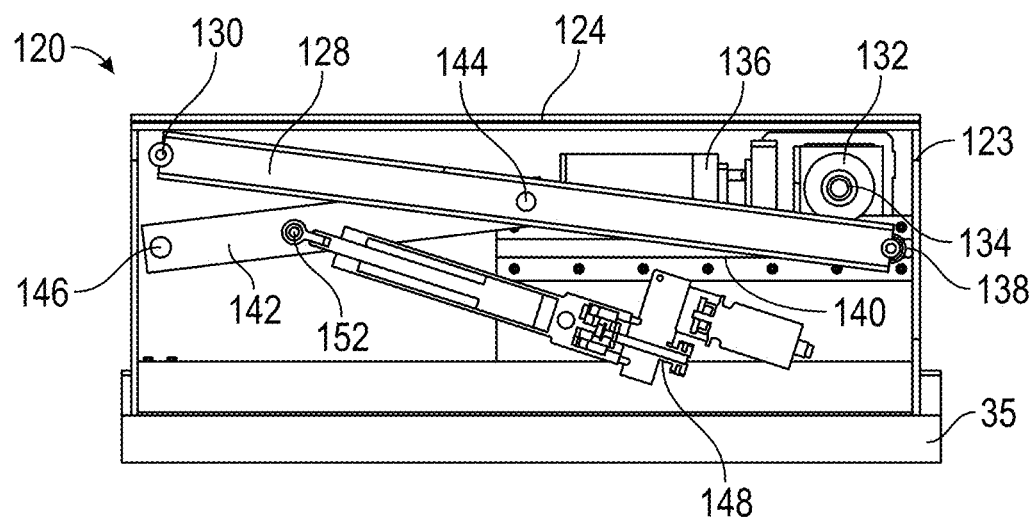
Figure 9:
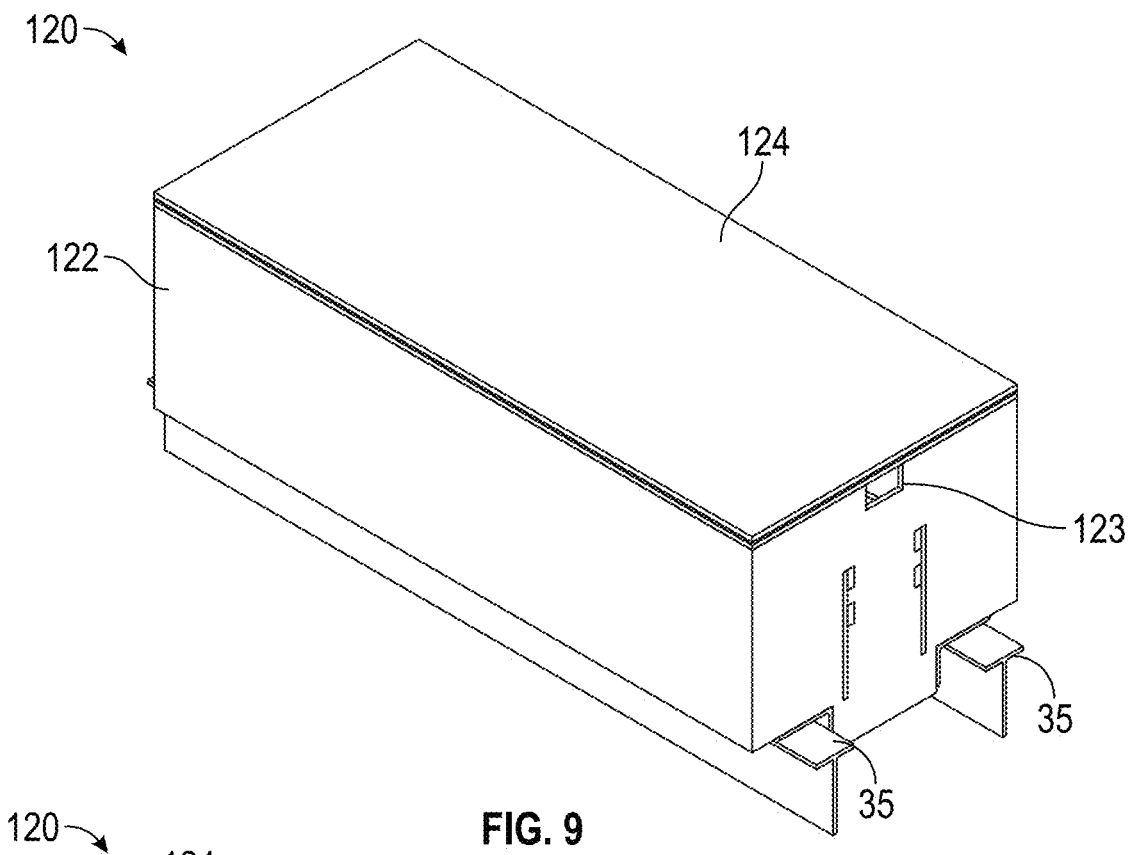
Figure 10:
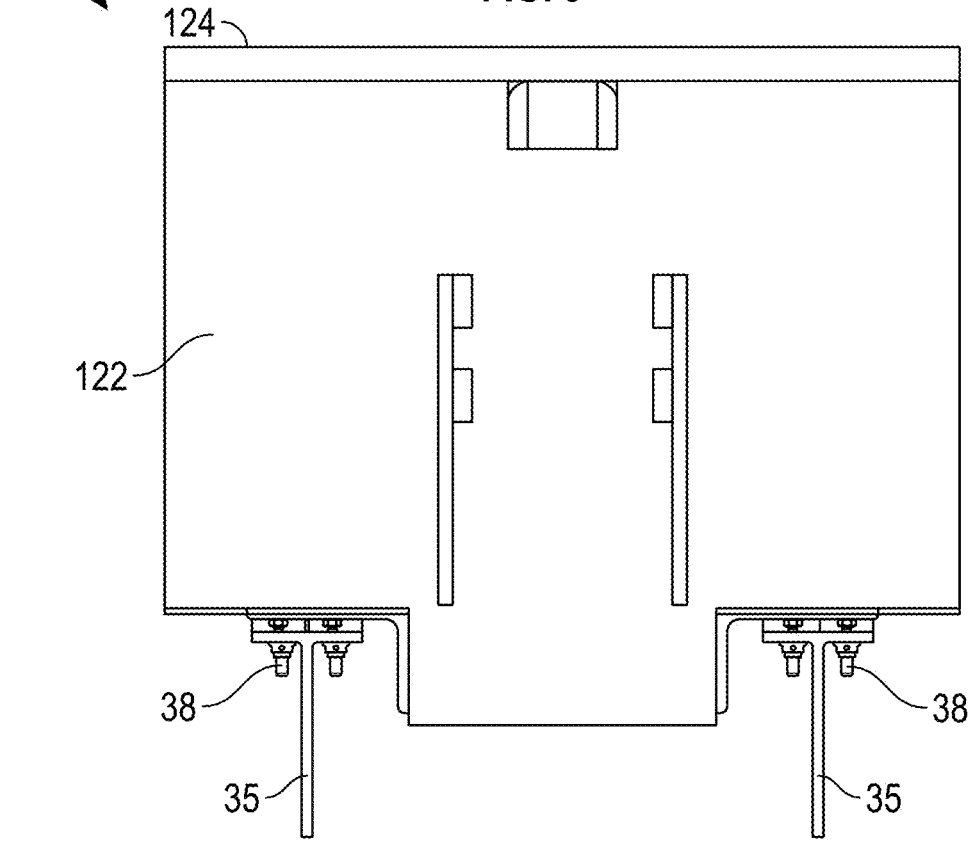

FIGS. 6-10 illustrate an example tensioning assembly 120 of a deployable slackline system in accordance with the present technology. FIGS. 6 and 7 are a perspective view and a side cutaway view, respectively, of the tensioning assembly 120 in a deployed configuration. FIGS. 8-10 are a side cross-sectional view, a perspective view, and an end view, respectively, of the tensioning assembly 120 in a stowed configuration. The cross-sectional view of FIG. 8 is taken along the line 8-8 shown in FIG. 6. The tensioning assembly 120 includes a housing 122 and a lid 124 which covers the top of the housing 122 while the tensioning assembly 120 is stowed and can open to permit deployment. A tensioning assembly post 128 is movably mounted within the tensioning assembly 120. When installed, the tensioning assembly 120 can be mounted to a supporting structure 35 (for example, steel beams or other structural components) of an installation environment (for example, the performance environment 10 of FIGS. 3-5) by mechanical fasteners 38 such as bolts or the like.

A bottom end of the tensioning assembly post 128 is coupled to rollers 138. The rollers 138 permit the bottom end of the tensioning assembly post 128 to slide laterally as the rollers 138 travel along tracks 140 mounted to the interior of the housing 122. The rollers 138 and tracks 140 thus generally constrain movement of the bottom end of the tensioning assembly post 128 to a horizontal dimension.

A slackline spool 132, sized to accommodate a length of the slackline material such as webbing, is also disposed near the bottom end of the tensioning assembly post 128. The slackline spool 132 is coupled by an axle 134 to a tensioning motor 136 configured to control the tension of the slackline by rotating the slackline spool 132 to take in or let out line from the slackline spool 132. In some embodiments, the axle 134 can further be connected to a secondary brake 154 which can be activated to stop rotation of the axle 134 in the event of a failure of the tensioning motor 136. Advantageously, because the tensioning motor 136 and the slackline spool 132 are mounted to the same tensioning assembly post 128 which defines the tensioning end of the suspended slackline, the tensioning assembly post 128 can be moved to raise and lower the tensioning end of the suspended slackline while retaining a constant nominal tension on the slackline, without requiring adjustment by the tensioning motor 136.

Figure 18A:
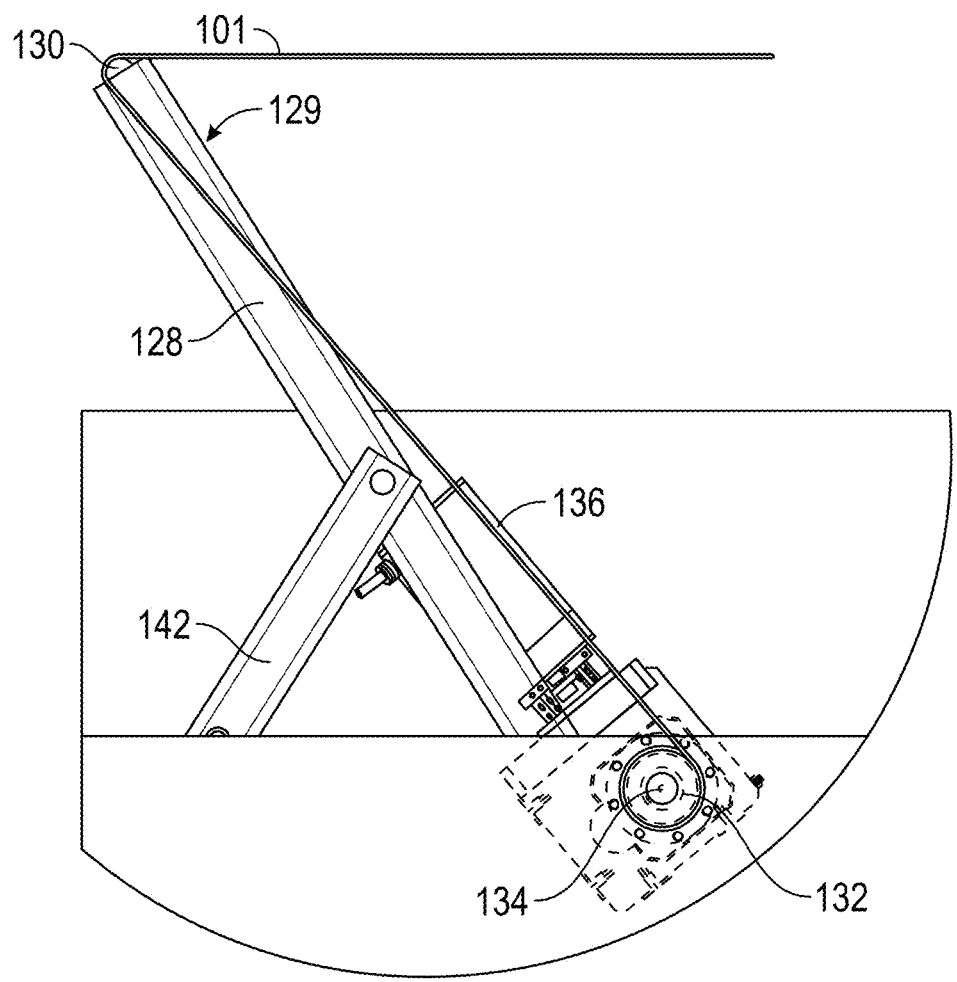
FIGS. 18A and 18B illustrate example slackline rigging configurations for the tensioning and termination assemblies of the present technology.

A top roller 130 is rotatably mounted at a top end of the tensioning assembly post 128 opposite the bottom end. An upper portion of the tensioning assembly post 128 proximate the top end can include a recess 129 such that the slackline webbing can extend from the slackline spool 132 through the recess 129 to pass around a back side of the top roller 130, as illustrated in FIG. 18A. Further rigging details of the tensioning assembly 120 will be described with reference to FIG. 18A.

Stowage and deployment of the tensioning assembly post 128, as well as intermediate height adjustments of the tensioning assembly post 128, can be controlled by a linear actuator 148. The linear actuator 148 moves the tensioning assembly post 128 via a mechanical linkage which can include a push rod 150 and one or more connecting rods 142. The connecting rods 142 are coupled to an intermediate section of the tensioning assembly post 128 at a first end by a moving pivot 144. The connecting rods 142 are coupled to the interior of the housing 122 at a second end opposite the first end by a fixed pivot 146. The push rod 150 is coupled to an intermediate section of the connecting rods 142 at a moving pivot 152. Extension of the push rod 150 by the linear actuator 148 causes the connecting rods 142 to rotate upward about the fixed pivot 146, which in turn causes a generally upward movement of the tensioning assembly post 128 via the moving pivot 144. The rollers 138 at the bottom end of the tensioning assembly post 128 are guided within the tracks 140 such that the height of the bottom end of the tensioning assembly post 128 is held constant, causing the end roller 130 of the tensioning assembly post 128 to move substantially vertically upward.

Figure 11:
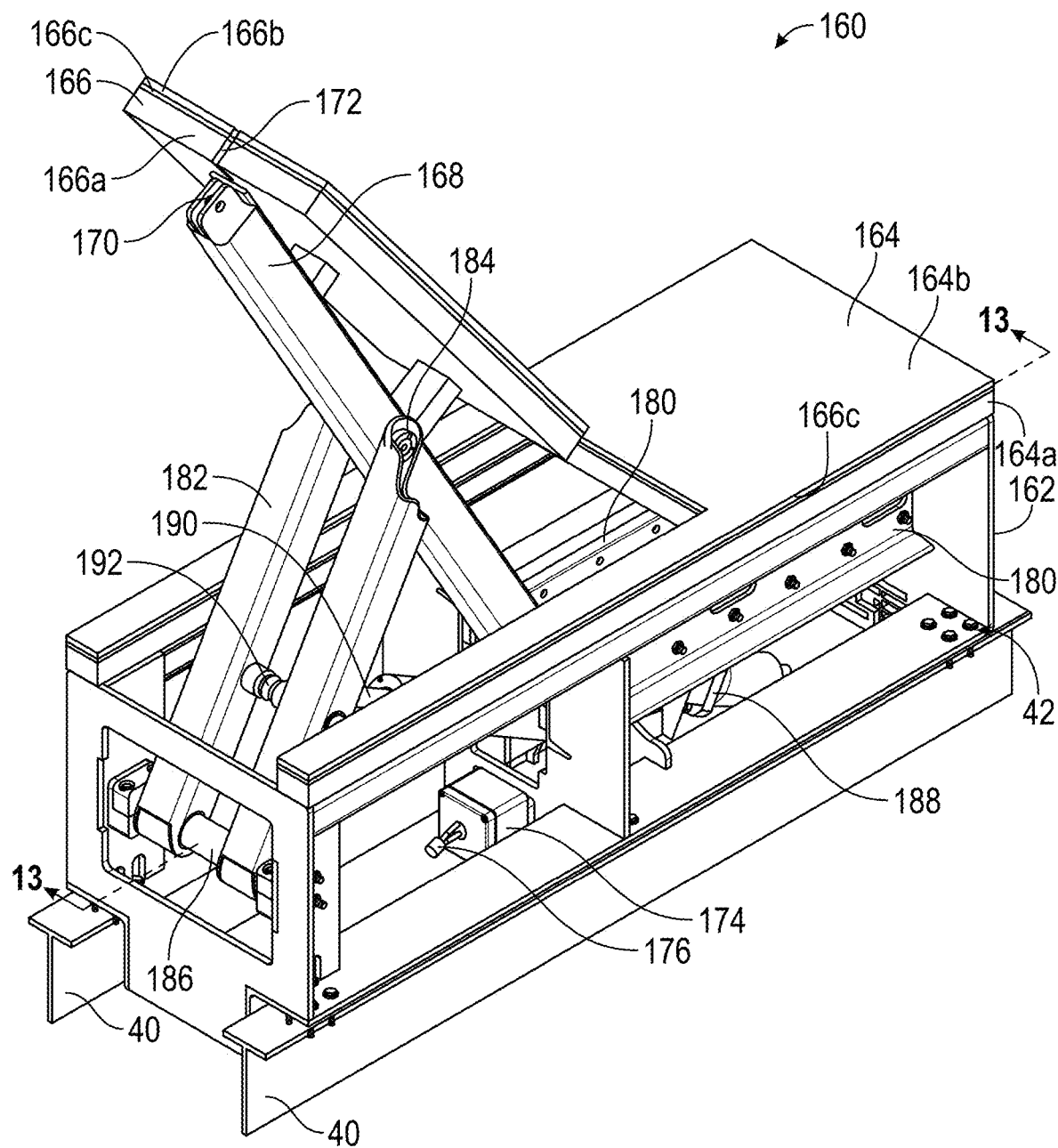
FIGS. 11-15 illustrate an example termination assembly of a deployable slackline system in accordance with the present technology.
Figure 12:
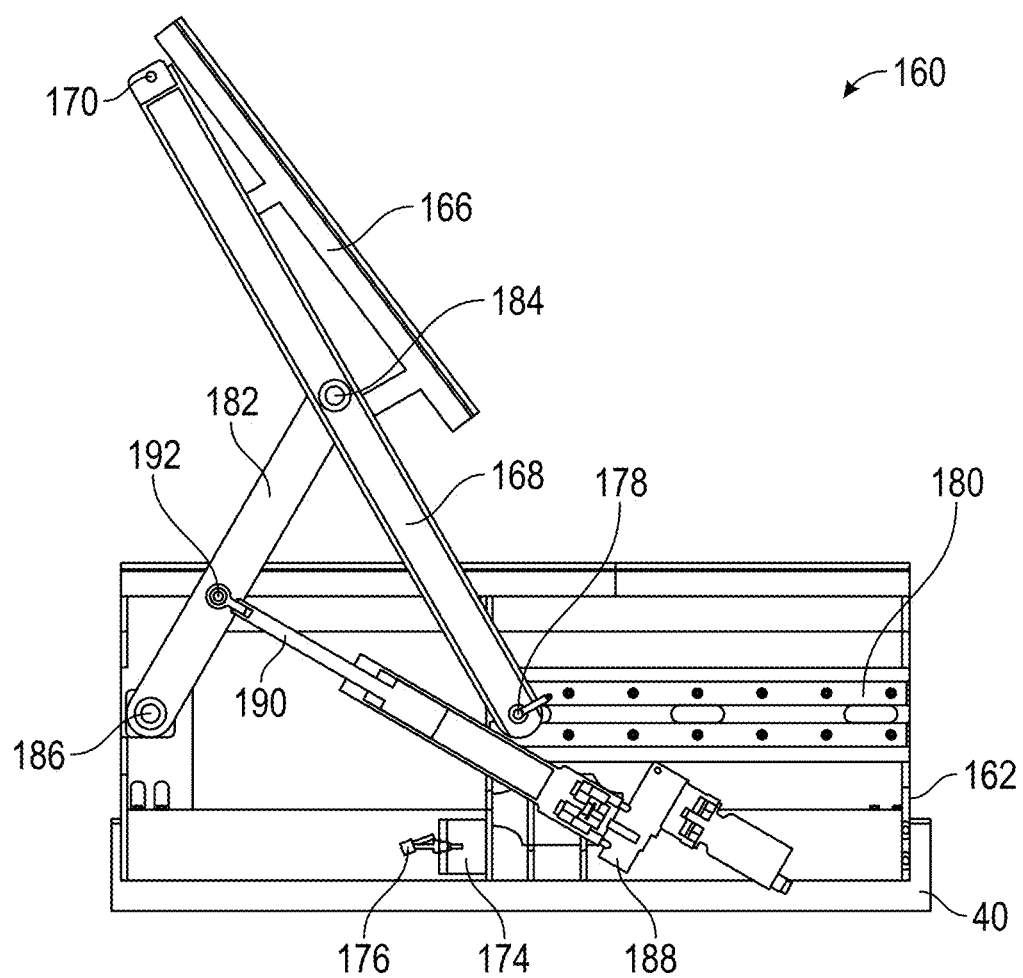
Figure 13:
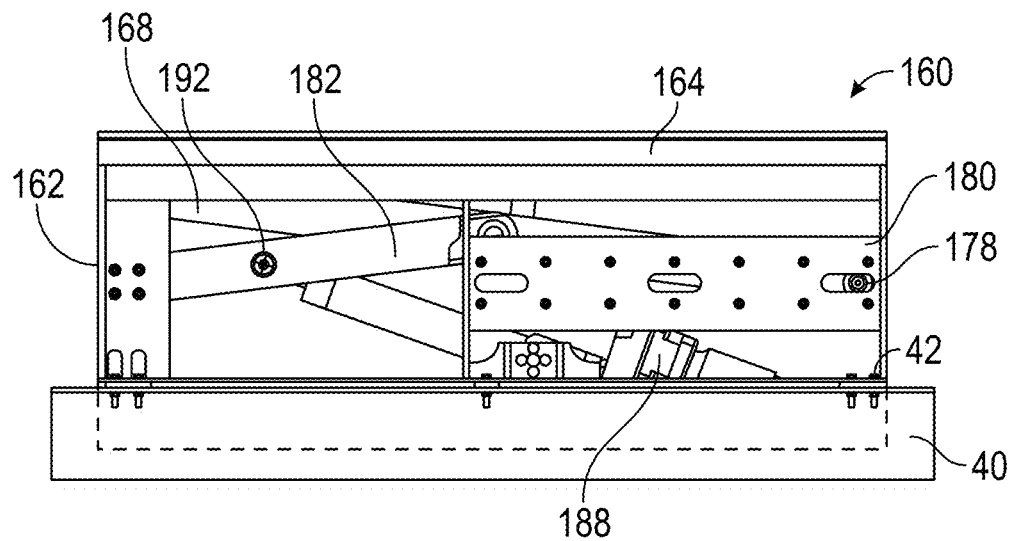
Figure 14:
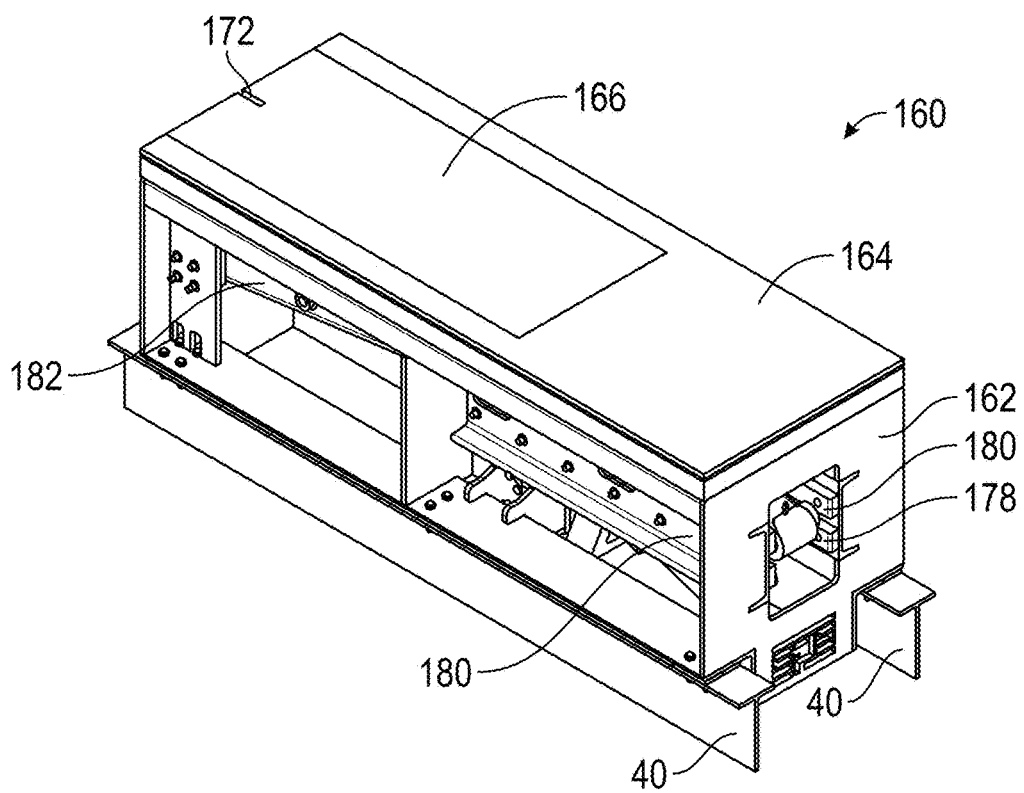
Figure 15:
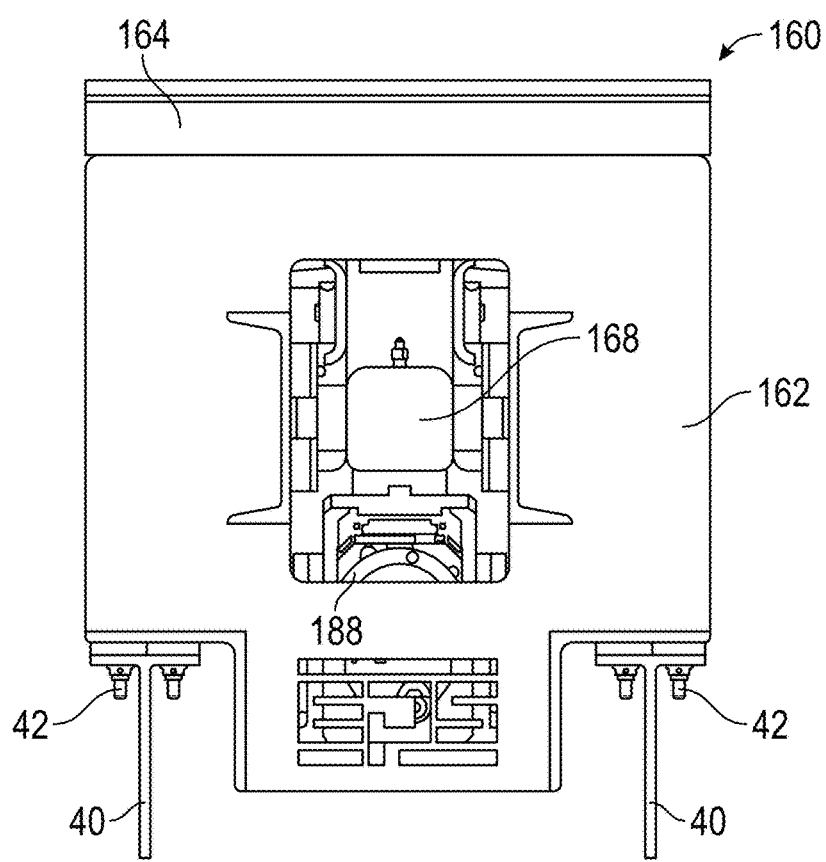

FIGS. 11-15 illustrate an example termination assembly 160 of a deployable slackline system in accordance with the present technology. FIGS. 11 and 12 are a perspective view and a side cutaway view, respectively, of the termination assembly 160 in a deployed configuration. FIGS. 13-15 are a side cross-sectional view, a perspective view, and an end view, respectively, of the termination assembly 160 in a stowed configuration. The cross-sectional view of FIG. 13 is taken along the line 13-13 shown in FIG. 11. The termination assembly 160 includes a housing 162 having a top surface 164 which covers the top of the housing 162. At least a portion of the top surface 164 can be a movable lid 166, which may be coupled to an extendable termination assembly post 168. The termination assembly post 168 is movably mounted within the termination assembly 160. When installed, the termination assembly 160 can be mounted to a supporting structure 40 (for example, steel beams or other structural components) of an installation environment (for example, the performance environment 10 of FIGS. 3-5) by mechanical fasteners 42 such as bolts or the like.

Similar to the tensioning assembly post 128 described above, a bottom end of the termination assembly post 168 can be mounted to rollers 178 configured to move within tracks 180 mounted to the interior of the housing 122 and which generally constrain the motion of the bottom end of the termination assembly post 168 to a horizontal dimension. A termination pin 170 is mounted at a top end of the termination assembly post 168 opposite the bottom end. The termination pin 170 serves as an anchor point for a termination end of the suspended slackline. In addition, the termination pin 170 may be a sensor such as a pin load cell or other force transducer, which may be used for measuring the tension on the slackline. In various embodiments, the webbing or other material of the slackline can be mounted directly around the termination pin 170, or can be affixed to one or more additional components which in turn are mounted around the termination pin 170. Further rigging details of the termination assembly 160 will be described with reference to FIG. 18B.

The lid 166 can include a slot 172 sized and shaped to accommodate the slackline material or connecting component therethrough. As shown in FIG. 14, when the lid 166 is closed in a stowed configuration of the termination assembly 160, the slot 172 provides a path for the slackline to extend through the lid 166 so that the slackline can remain attached to the termination pin 170 within the termination assembly 160 while the lid 166 is fully closed.

The top surface 164 and the lid 166 of the termination assembly 160 can also be configured to serve as a safe walking surface. Accordingly, the top surface 164 and the lid 166 can be made from or coated with a surface suitable for walking. In aquatic performance applications, moreover, it may be desirable for the termination post 160 to be safe for barefoot walkers such as performers, crewmembers, and/or audience members. In one example configuration, the lid 166 and the top surface 164 of the termination assembly 160 can include a multi-layered structure including a structural material 166a (e.g., a metal such as aluminum or steel, which may be solid or may be a grating), and an outer layer 166b suitable for barefoot walking (e.g., a resilient and/or slip-resistant material, such as a rubberized and/or textured floor coating). An interface layer 166c (e.g., a plastic such as PVC or the like) may be included between the structural material 166a and the outer layer 166b in some embodiments.

Stowage and deployment of the termination assembly post 168, as well as intermediate height adjustments of the termination assembly post 168, can be controlled by a linear actuator 188. The linear actuator 188 moves the termination assembly post 168 via a mechanical linkage which can be substantially similar to the mechanical linkage present in the tensioning assembly 120. For example, the mechanical linkage of the termination assembly 160 can include a push rod 190 and one or more connecting rods 182. The connecting rods 182 are coupled to an intermediate section of the termination assembly post 168 at a first end by a moving pivot 184. The connecting rods 182 are coupled to the interior of the housing 122 at a second end opposite the first end by a fixed pivot 186. The push rod 190 is coupled to an intermediate section of the connecting rods 182 at a moving pivot 192. Extension of the push rod 190 by the linear actuator 188 causes the connecting rods 182 to rotate upward about the fixed pivot 186, which in turn causes a generally upward movement of the termination assembly post 168 via the moving pivot 184. The rollers 178 at the bottom end of the termination assembly post 168 are guided within the tracks 180 such that the height of the bottom end of the termination assembly post 168 is held constant, causing the termination pin 170 of the termination assembly post 168 to move substantially vertically upward.

In some circumstances, such as in aquatic installation environments, the housing 162 may be configured to drain a quantity of water or other liquid which may incidentally splash or flow into the housing, for example, while the lid 166 is open in a deployed configuration. However, in the event of excessive water flow, or a clog or other failure of a drainage path, etc., it is possible for an undesirable amount of water to accumulate within the housing 162 which could submerge the linear actuator 188 or other components and interfere with proper operation of the termination post 160. Accordingly, a float sensor 174 with a float 176 may be included within the housing 162. The float sensor 174 may be installed with the float 176 disposed at a maximum allowable water level (e.g., slightly below a level where static water would interfere with operation of the linear actuator 188 and/or the associated mechanical linkage). A static water level within the housing that exceeds the height of the float 176 actuates the float sensor 174, causing the float sensor 174 to send a signal to monitoring and control circuitry of the slackline system, as will be described in greater detail with reference to FIG. 17.

Figure 16A:
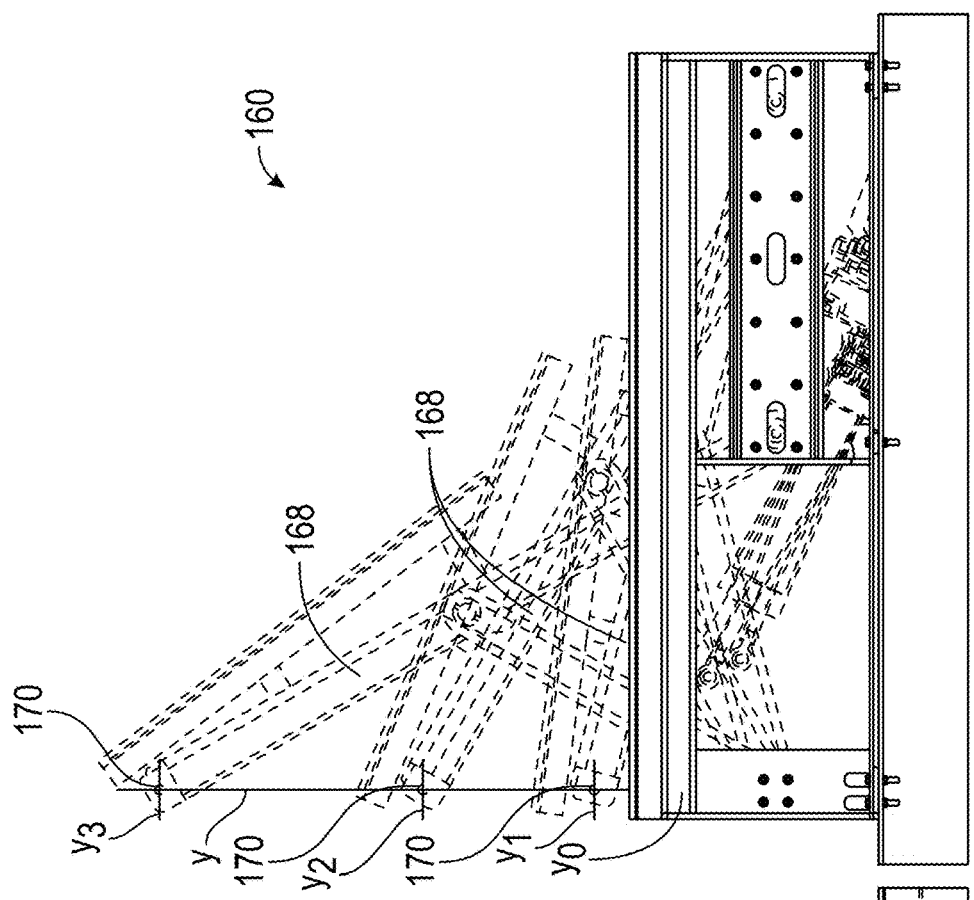
FIGS. 16A and 16B illustrate an example range of vertical movement achievable using the tensioning and termination assemblies of the present technology.
Figure 16B:
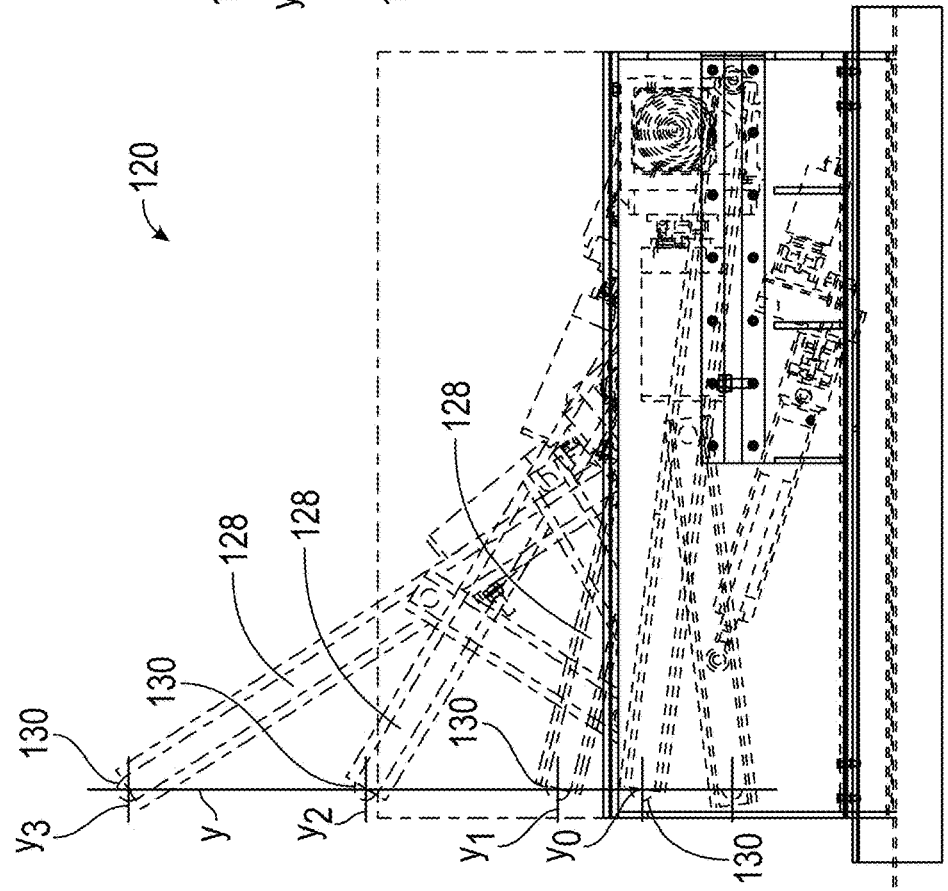

FIGS. 16A and 16B illustrate an example range of vertical movement achievable using the tensioning and termination assemblies of the present technology. FIG. 16A depicts the tensioning assembly 120 of FIGS. 6-10, with broken lines illustrating a stowed position of the tensioning assembly post 128 and several deployed positions of the tensioning assembly post 128 at different heights. FIG. 16B similarly depicts the tensioning assembly 160 of FIGS. 11-15, with broken lines illustrating a stowed position of the termination assembly post 168 and several deployed positions of the termination assembly post 168 at different heights.

As illustrated in FIGS. 16A and 16B, the mechanical linkages described above with reference to FIGS. 6-15 are advantageous in the context of the present technology as they provide for a substantially direct vertical range of motion despite being implemented by a plurality of pivoting members that can compactly fold into a relatively small housing in the stowed configuration. Significantly, the folding operation of the tensioning and termination assemblies 120, 160 allows for stowage in a substantially smaller height dimension than the deployable height of the slackline system. For example, in a non-limiting example embodiment, the tensioning assemblies 120 and termination assemblies 160 disclosed herein can be capable of suspending a slackline under tension at heights up to two feet, three feet, four feet, or higher, while being stowable within a housing measuring only approximately two feet in height. In one particular non-limiting example, a slackline height of over 41" above the top surfaces of the tensioning and termination assemblies 120, 160 may be achieved while the tensioning assembly 120 has length, width, and height dimensions of about 5'7", 2'6", and 2'2", respectively, and the termination assembly 160 has length, width, and height dimensions of about 5'7", 1'2", and 2'3", respectively.

As shown, the mechanical linkages of the tensioning assembly 120 and the termination assembly cause the end roller 130 or the termination pin 170 to move along a vertical axis y (e.g., between stowed position $y_0$ and deployed positions $y_1$, $y_2$, and $y_3$) under control of the linear actuators described above. Accordingly, because both the tensioning assembly post 128 and the termination assembly post 168 move along a directly vertical path, the height of the slackline suspended between a tensioning assembly 120 and a corresponding termination assembly 160 can be raised and lowered synchronously during performance, even while a performer is actively performing on the slackline, without changing the nominal tension on the slackline and without imparting any lateral movement that could potentially interfere with a performer's balance or positioning.

Figure 17:
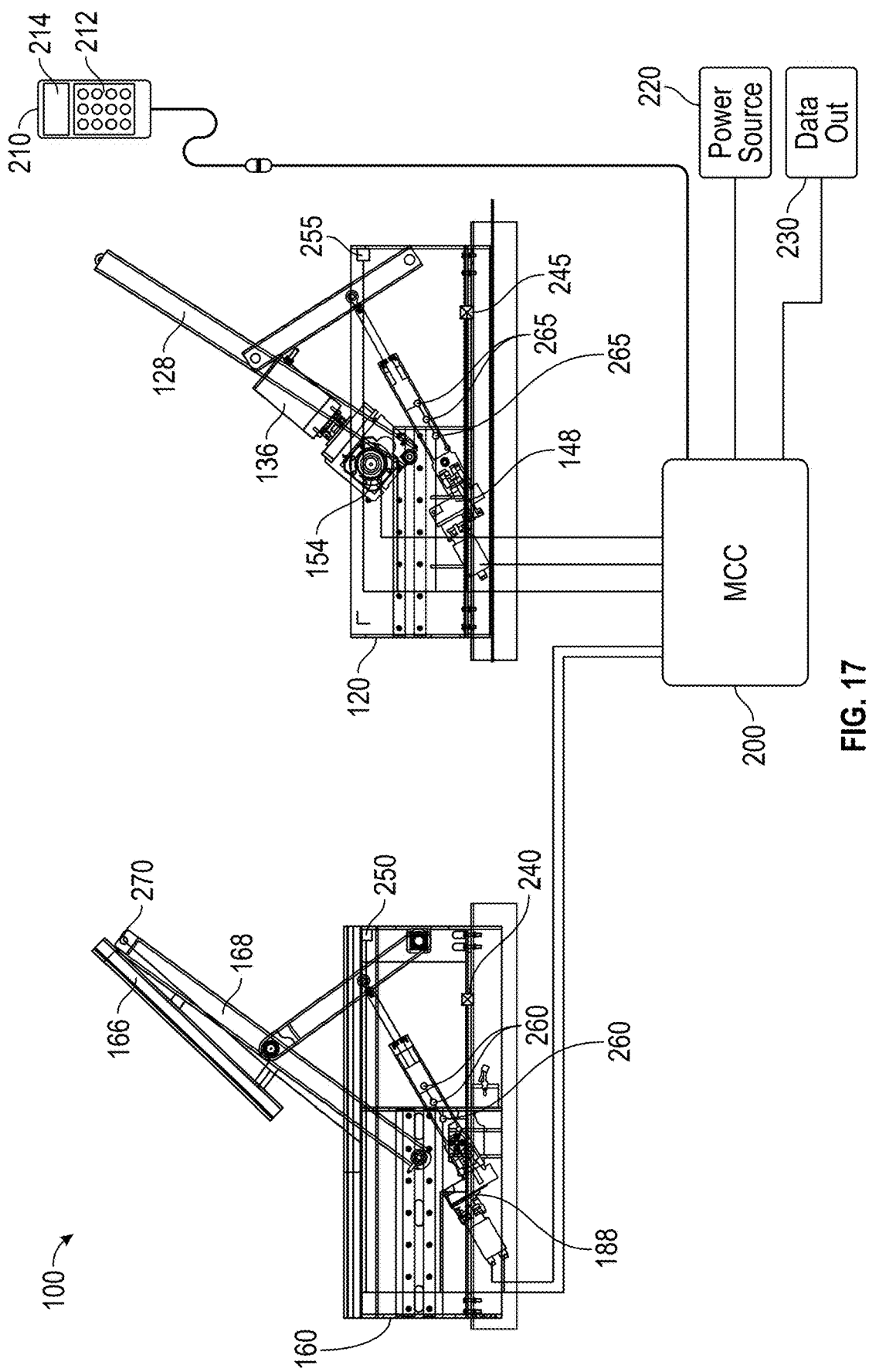
FIG. 17 is a system diagram schematically illustrating an example sensing and control configuration of the deployable slackline systems of the present technology.

FIG. 17 is a system diagram schematically illustrating an example sensing and control configuration of the deployable slackline systems of the present technology. A slackline system 100 includes a tensioning assembly 120 and a termination assembly 160, as well as a motor control center ("MCC") 200 or other suitable processing circuitry in communication with the tensioning assembly 120 and the termination assembly 160. The MCC 200 can further be in communication with a user device 210, a power source 220, and a data output 230 or other remote communication interface. Each of the connections illustrated in FIG. 17 may be implemented as a wired connection, a wireless connection, or a combination of wired and wireless connections.

As described above with reference to FIGS. 6-10, the tensioning assembly 120 can include a tensioning motor 136 configured to adjust the tension of a slackline by taking in or letting out slackline material, a secondary brake 154 associated with the tensioning motor 136, and a linear actuator 148 configured to raise and lower the tensioning assembly post 128. The tensioning motor 136, the secondary brake 154, and the linear actuator 148 can each be in communication with the MCC 200 to receive control signals from the MCC 200 and/or to send monitoring signals indicative of component status to the MCC 200. The tensioning assembly 120 can further include a float sensor 245 configured to transmit a signal to the MCC 200 in response to being submerged if a water level within the tensioning assembly 120 reaches the height of the float sensor 245, and a home sensor 255 configured to transmit a signal to the MCC 200 when the tensioning assembly 120 reaches a stowed configuration (e.g., based on the lid of the tensioning assembly 120 being closed or on the tensioning assembly post 128 reaching a stowed position). One or more position switches 265 can further be included to send signals to the MCC 200 indicative of a current position, an end of travel, and/or an ultimate travel limit of the linear actuator 148.

As described above with reference to FIGS. 11-15, the termination assembly 160 can include a linear actuator 188 configured to raise and lower the termination assembly post 168. The linear actuator 188 can be in communication with the MCC 200 to receive control signals from the MCC 200 and/or to send monitoring signals indicative of component status to the MCC 200. The termination assembly 160 can further include a float sensor 240 configured to transmit a signal to the MCC 200 in response to being submerged if a water level within the termination assembly 160 reaches the height of the float sensor 240, a home sensor 250 configured to transmit a signal to the MCC 200 when the termination assembly 160 reaches a stowed configuration (e.g., based on the lid 166 or the tensioning assembly post 168 reaching a stowed position). One or more position switches 260 can further be included to send signals to the MCC 200 indicative of a current position, and end of travel, and/or an ultimate travel limit of the linear actuator 188. A tension sensor 270, such as a pin load cell or other tension or mechanical load sensor, is configured to continuously or periodically send signals to the MCC 200 indicative of a current slackline tension. In some embodiments, the tension sensor 270 can be the same component as the termination pin 170 of FIGS. 11-15.

The user device 210 can be any suitable device for receiving user input and/or displaying one or more status indicators associated with the slackline system 100. In some embodiments, the user device 210 can be a handheld or mobile device in wired or wireless communication with the MCC 200. In one non-limiting example implementation, the user device 210 is a handheld touch screen controller located in an area where it can be operated by a user in view of the slackline system 100.

The user device 210 can receive control inputs from the user and can send corresponding control signals to the slackline system 100 via the MCC 200. Example control functions including raising, lowering, stowing, or deploying a slackline, increasing or decreasing tension on a slackline, selection of one or more preset heights and/or tensions for a slackline, emergency stop, etc. An individual control input such as "up" or "down" for raising or lowering a slackline may result in corresponding control signals being sent simultaneously from the MCC 200 to the linear actuators 148, 188 of both the tensioning assembly 120 and the termination assembly 160 so that the tensioning assembly 120 and the termination assembly 160 raise or lower the slackline together. In performance environments including multiple slacklines (e.g., the two-slackline system illustrated in FIGS. 1-5), each slackline may be individually addressable or controllable with the user device 210. For example, in some embodiments the user device 210 may include buttons such as "stage left up," "stage left down," "stage right up," and "stage right down" for individually controlling two slacklines in a performance environment.

The MCC 200 can be configured for control and monitoring of the slackline system 100. The MCC 200 receives control signals from the user device 210 and sends corresponding control signals to the linear actuators 148, 188 and to the tension motor 136. In some embodiments, the MCC 200 is configured to send signals to the linear actuators 148, 188 to cause the tensioning assembly post 128 and the termination assembly post 168 to move in synchronization to raise and/or lower the slackline (e.g., by moving the tensioning assembly post 128 and the termination assembly post 168 at the same time and/or at the same speed). The MCC 200 is further configured to monitor the status of the tensioning assembly 120 and the termination assembly 160 by receiving signals from the float sensors 240, 245, home sensors 250, 255, position switches 260, 265, and tension sensor 270, and may send control signals in response to signals received from the various sensors. For example, in response to a signal from one or both of the float sensors 240, 245, the MCC 200 may send control signals to one or both linear actuators 148, 188 and/or to the tensioning motor 136 pausing operation of the linear actuators 148, 188 and/or the tensioning motor 136. The MCC 200 can further be configured to transfer power for operation of the linear actuators 148, 188 and/or the tensioning motor 136 from the power source 220. Data corresponding to the status of the slackline system 100, such as signals received from sensors, control outputs, or the like, may be transferred via the data output 230 such as for monitoring or storage of the slackline system 100, and/or to interface with additional equipment or components of a performance environment in which the slackline system 100 is operating.

Figure 18B:
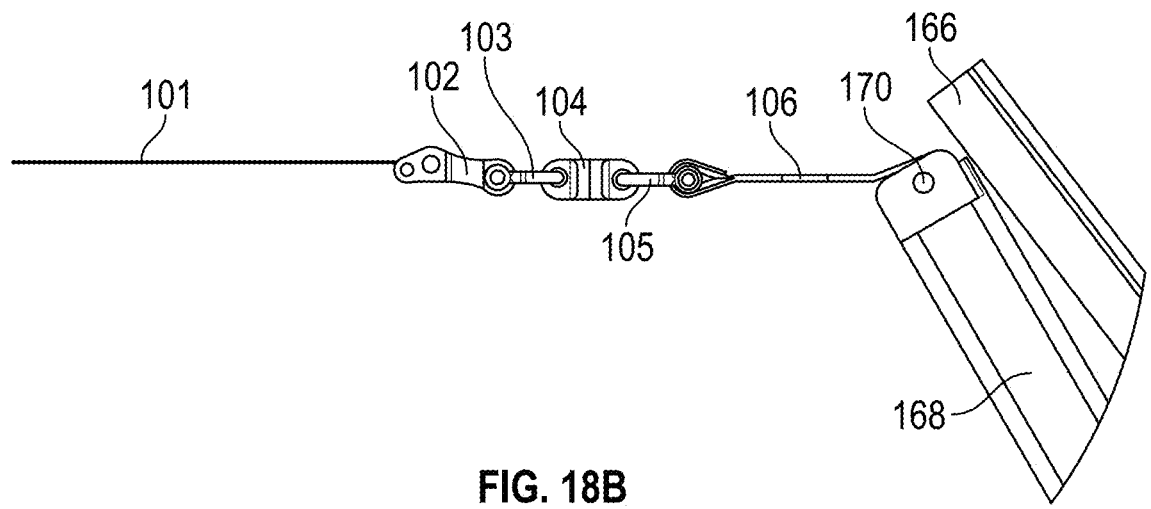

FIGS. 18A and 18B illustrate example slackline rigging configurations for the tensioning and termination assemblies of the present technology. FIG. 18A illustrates a portion of the tensioning assembly 120 of FIGS. 6-10; FIG. 18B illustrates a portion of the termination assembly 160 of FIGS. 11-15. The rigging configurations illustrated in FIGS. 18A and 18B are exemplary, and may vary without departing from the spirit or scope of the present disclosure.

As shown in FIG. 18A, the tensioning end of the slackline 101 includes an end portion of the slackline 101 which is wound around the slackline spool 132. The slackline 101 continues from the slackline spool 132, through the recess 129 in the tensioning assembly post 128 and around the end roller 130 which defines a tensioning end of the suspended portion of the slackline. The tension of the slackline 101 can accordingly be adjusted by the tensioning motor 136 which rotates the slackline spool 132 via the axle 134 to take in or let out slackline material onto or from the slackline spool 132. In the example configuration of FIG. 18A, clockwise rotation of the axle 134 and the slackline spool 132 causes the slackline material to be taken in and wrapped around the slackline spool 132, increasing the tension on the suspended portion of the slackline 101. Conversely, counterclockwise rotation of the axle 134 and the slackline spool 132 causes slackline material to be let out from the slackline spool 132, decreasing the tension on the suspended portion of the slackline 101.

As shown in FIG. 18B, the termination end of the slackline 101 ends at or near the termination pin 170. In some embodiments, one or more additional components can be used to connect the end of the slackline material (e.g., a nylon webbing or the like) to the termination pin 170. For example, in some embodiments, the end of the slackline material can be secured to a paddle 102 configured to securely fasten a wide, flat material such as webbing. The paddle 102 can be connected by a first shackle 103 to a swivel 104 such that the slackline 101 can flex, twist, and/or rotate about the length of the slackline 101 (e.g., as a performer moves on the line or due to other forces acting on the suspended portion of the slackline) without imparting rotational forces to the termination pin 170. The swivel 104 can be connected by a second shackle 105 to a dogbone 106 which may include a wire or cord (e.g., a metallic braid or the like) that secures the rigging to the termination pin 170. In some implementations, the rigging configuration depicted in FIG. 18B may advantageously result in more reliable slackline tension readings at the termination pin 170 by insulating the termination pin 170 from rotational forces present in the slackline 101.

FIGS. 19A-19D illustrate an example preset configuration of the deployable slackline systems of the present technology. As discussed previously, the tensioning assembly 120 may be configured to let out excess line when the slackline system is in the stowed configuration. For example, if the slackline system is installed to span at least a portion of a pool or other setting having a depression between the termination and tensioning assemblies, letting out excess line may allow the slackline 101 to rest on the bottom of the pool or other depression while stowed. In the pool implementation, this configuration allows the pool to be used safely while the slackline is stowed by avoiding the presence of a tensioned slackline under the water.

Figure 19A:
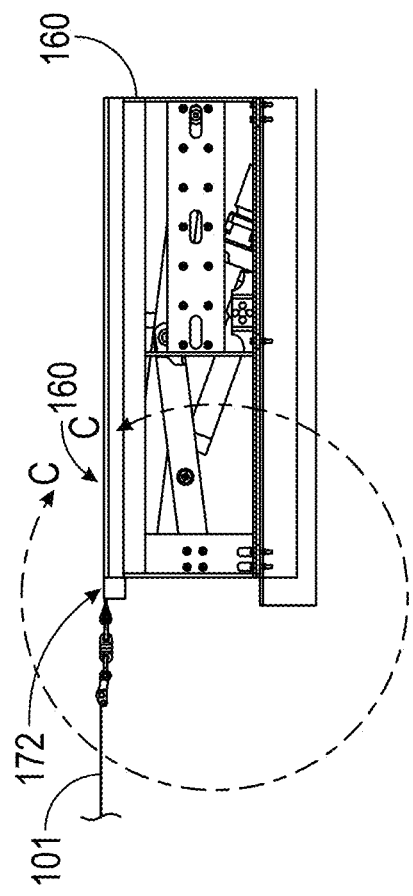
FIGS. 19A-19D illustrate an example preset configuration of the deployable slackline systems of the present technology.

In such configurations, the system may be configured to pre-tension the line prior to deployment, referred to as a preset configuration, by taking up sufficient slack and adjusting the slackline to the desired tension for use or to an intermediate tension slightly lower than a final nominal tension for use. Such a preset configuration is illustrated in FIGS. 19A-19D. As shown in FIG. 19A, the tensioning assembly 120 may be partially deployed, such as by opening the lid 124, and partially extending the tensioning assembly arm 128 so that the end roller 130 suspends the slackline 101 above the tensioning assembly 120. The tensioning motor 136 may take up some of the excess length of slackline 101 such that the slackline 101 is at a desired nominal tension for performance or slightly lower than the nominal tension.

Figure 19B:
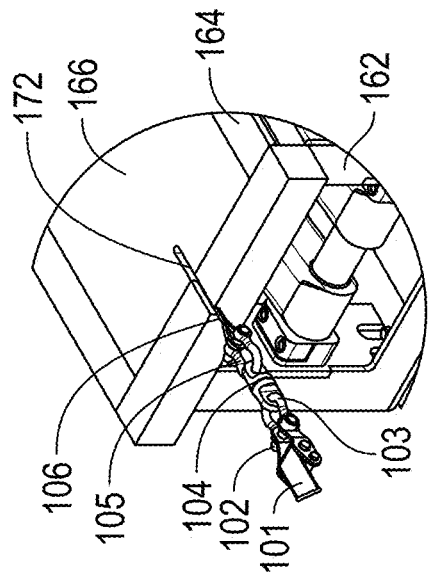
Figure 19C:
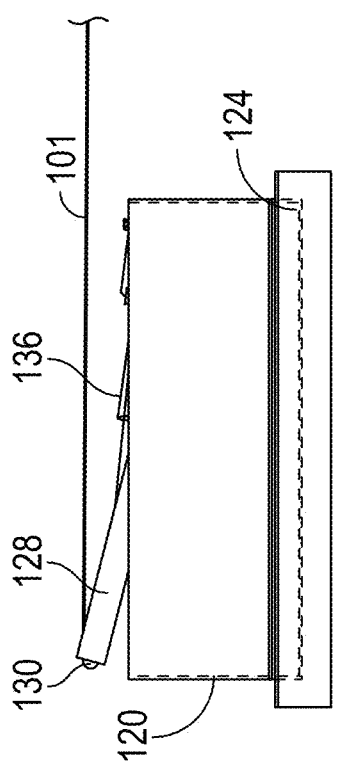
Figure 19D:
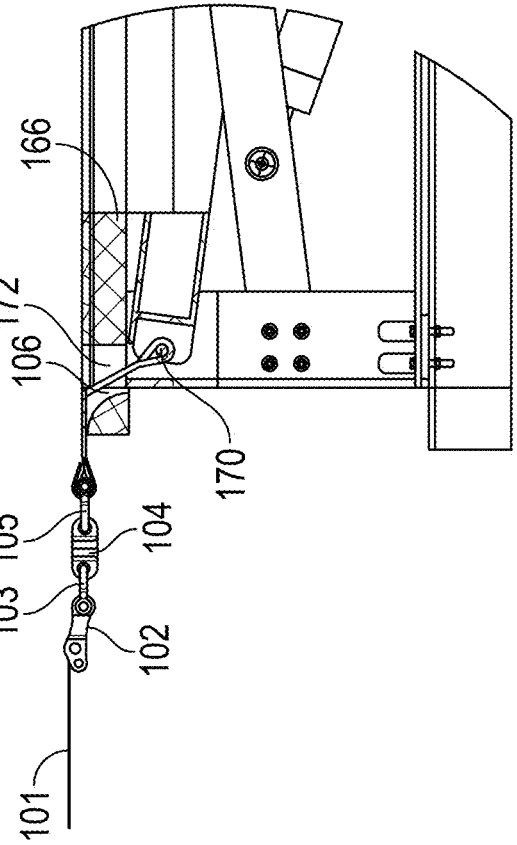

FIGS. 19C and 19D provide side cutaway and perspective views of the portion of the termination assembly 160 indicated by circle C-C in FIG. 19B. As shown in FIGS. 19B-D, the termination assembly 160 may remain in a stowed configuration in the preset condition. While the excess length of slackline 101 is taken up at the tensioning end of the slackline, the termination pin 170 remains stowed within the termination assembly 160, with the dogbone 106 extending through the slot 172 in the lid 166. In this configuration, the lid 166 can remain contiguous with the upper surface 164 of the termination assembly such that the top of the termination assembly 160 can continue to form a safe walking surface while in the preset configuration. The system can remain in the preset configuration until the slackline 101 is to be used, at which time the termination assembly 160 can be deployed and the slackline 101 can be adjusted to a desired nominal tension by the tensioning motor 136 of the tensioning assembly 120.

Figure 20:
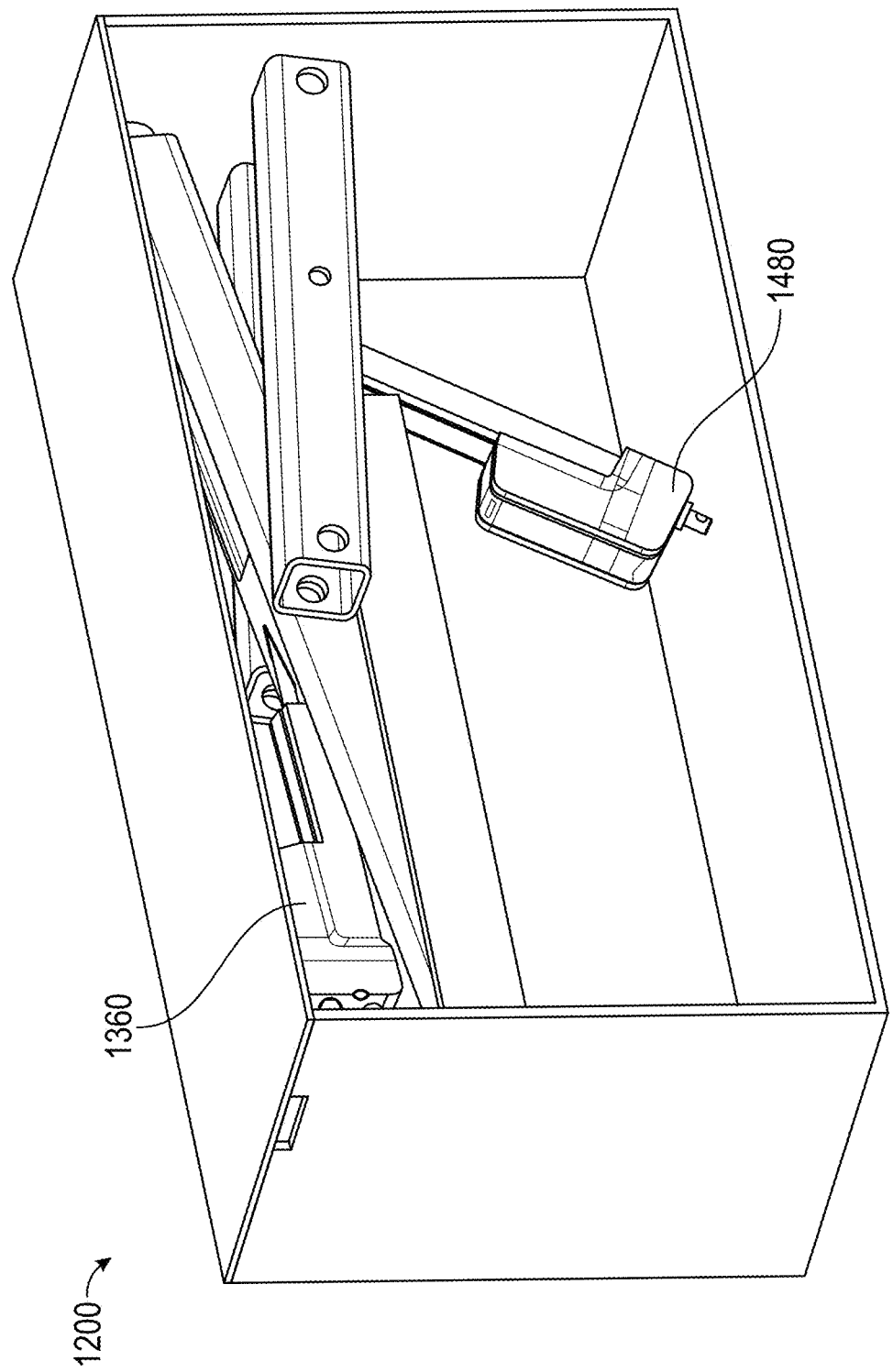
FIG. 20 illustrates a further example tensioning assembly of a deployable slackline system in a stowed configuration in accordance with the present technology.
Figure 21:
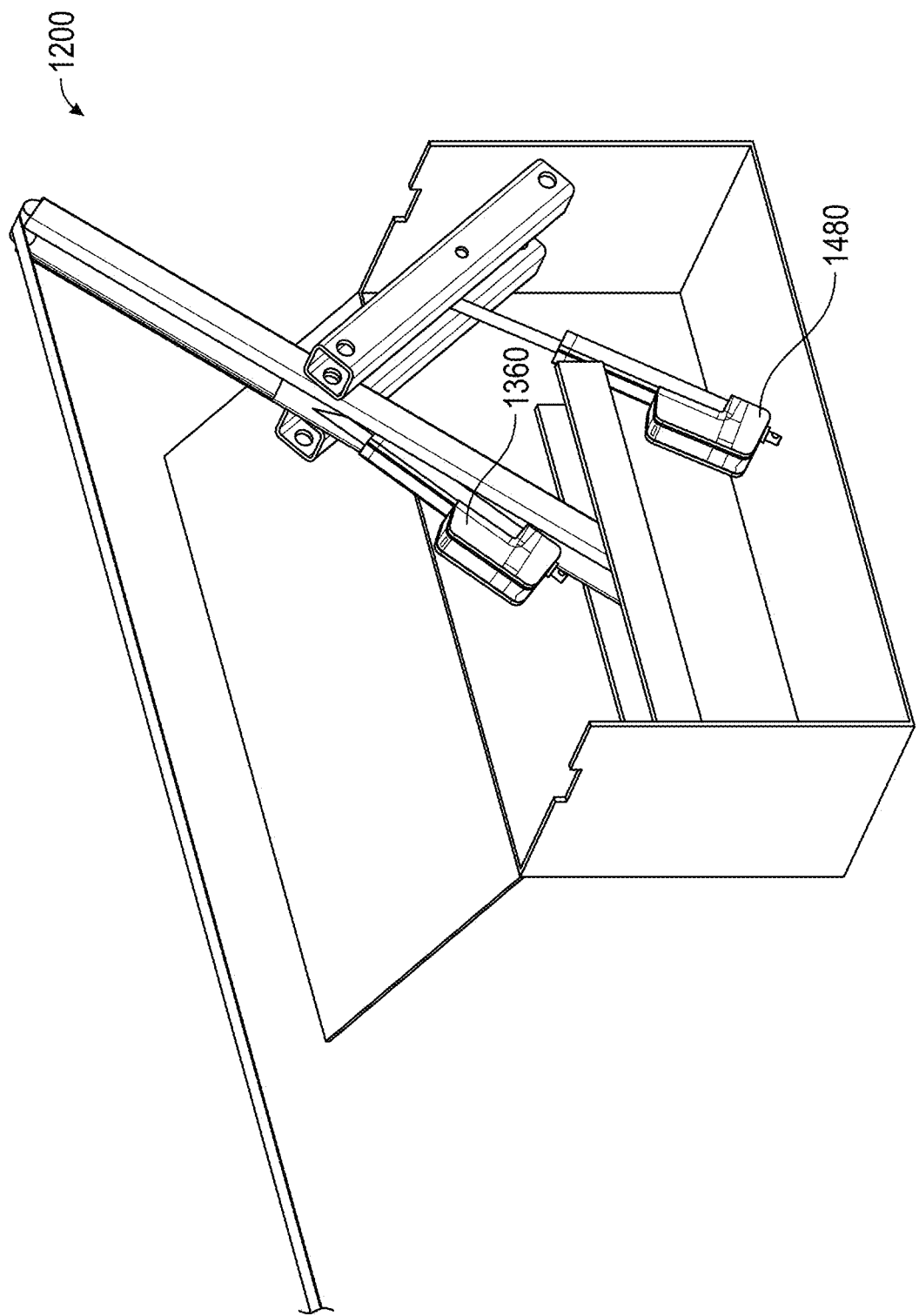
FIG. 21 illustrates the example tensioning assembly of FIG. 20 in a deployed configuration in accordance with the present technology.

FIGS. 20 and 21 illustrate a further example tensioning assembly 1200 of a deployable slackline system such as the system of FIGS. 1-5. FIG. 20 illustrates the tensioning assembly 120 in a stowed configuration. FIG. 21 illustrates the tensioning assembly 120 in a deployed configuration. As shown in FIGS. 20 and 21, in some embodiments a tensioning assembly 120 may incorporate a linear actuator 1360, rather than a motor with a slackline spool as described above with regard to FIGS. 6-10, to adjust tension of the slackline.

A second linear actuator 1480 may similarly be incorporated to adjust the height of the slackline as described elsewhere herein.

The linear actuators described throughout the present disclosure may be, for example, electrical actuators, hydraulic actuators, or any other suitable type of linear actuator, or a combination thereof.

ADDITIONAL EMBODIMENTS

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein. Although certain embodiments disclosed herein are described in the context of slacklines in aquatic performance environments, the systems, devices, and methods described herein may equally be implemented in any other suspended line context without departing from the spirit or scope of the present technology.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or nonvolatile memory devices, CD-ROMs, magnetic tape, flash drives, and optical data storage devices.

What is claimed is:

1. A method of operating a deployable slackline system comprising a tensioning assembly and a termination assembly, the method comprising, under control of one or more processors of the deployable slackline system:
   causing a tensioning motor to set a nominal tension in at least a portion of a slackline, the portion of the slackline supported at a first end by a tensioning assembly post of the tensioning assembly and supported at a second end opposite the first end by a termination assembly post of the termination assembly;
   moving the tensioning assembly post to adjust a height of the first end of the portion of the slackline; and
   moving the termination assembly post during a movement of the tensioning assembly post.

2. The method of claim 1, further comprising receiving at least one control signal to change the height or the nominal tension of the portion of the slackline.

3. The method of claim 2, wherein:
   the at least one control signal comprises a signal corresponding to a control input to raise the portion of the slackline, a control input to lower the portion of the slackline, or a selection of a preset height; and
   the one or more processors activate a first actuator associated with the tensioning assembly post and a second actuator associated with the termination assembly post in response to the signal.

4. The method of claim 2, wherein:
   the at least one control signal comprises a signal corresponding to a control input to increase the nominal tension, a control input to decrease the nominal tension, or a selection of a preset tension; and
   the method further comprises causing the tensioning motor to adjust the nominal tension in response to the signal.

5. The method of claim 2, wherein the slackline is one of a plurality of slacklines of the deployable slackline system, and wherein the at least one control signal includes an identifier of the slackline.

6. The method of claim 1, wherein the portion of the slackline spans at least a portion of a pool.

7. The method of claim 6, further comprising transitioning to a stowed configuration by causing the tensioning motor to let out a length of slackline such that at least a second portion of the slackline contacts a bottom surface of the pool.

8. The method of claim 6, further comprising transitioning the deployable slackline system to a stowed configuration by:
   causing the tensioning motor to let out a length of slackline such that the portion of the slackline is disposed below a water level of the pool; and
   moving the tensioning assembly post and the termination assembly post to decrease the height of the first end and the second end of the portion of the slackline.

9. The method of claim 1, wherein the tensioning assembly post and the termination assembly post are moved in parallel motion.

10. The method of claim 9, wherein the parallel motion of the tensioning assembly post and the termination assembly post comprises a combination of linear and rotational motion.

11. The method of claim 1, wherein the deployable slackline system further comprises:
   one or more additional slacklines having portions supported by one or more additional tensioning assemblies and one or more additional termination assemblies; and
   one or more additional tensioning motors configured to control nominal tensions of the portions of the one or more additional slacklines.

12. The method of claim 11, further comprising independently controlling, under control of the one or more processors, heights and nominal tensions of the slackline and of individual ones of the one or more additional slacklines.

13. The method of claim 1, further comprising maintaining the nominal tension while a slackliner stands, walks, runs, balances, jumps, or tricklines on the portion of the slackline.

14. The method of claim 1, further comprising maintaining the nominal tension while an actual tension of the portion of the slackline fluctuates.

15. The method of claim 1, further comprising controlling tension of the portion of the slackline by causing the tensioning motor to rotate a slackline spool to take in or let out slackline material.

16. The method of claim 1, further comprising inhibiting rotation of a slackline spool to maintain the nominal tension in the portion of the slackline.

17. The method of claim 1, further comprising receiving one or more signals from a sensor in the termination assembly configured to measure an actual tension of the portion of the slackline, wherein the one or more processors control the tensioning motor based at least in part on the one or more signals.

18. The method of claim 1, wherein at least one of the tensioning assembly and the termination assembly comprises a housing having a lid comprising a walking surface thereon, and wherein the method further comprises transitioning to a stowed configuration by moving the lid to a position in which the walking surface is contiguous with a surrounding static walking surface.

19. The method of claim 1, further comprising, prior to causing the tensioning motor to set the nominal tension, causing the tensioning motor to pre-tension the portion of the slackline at an intermediate tension lower than the nominal tension while at least one of the tensioning assembly and the termination assembly is in a stowed configuration.

20. The method of claim 1, further comprising:
   receiving a signal from a float sensor located at the tensioning assembly or the termination assembly; and
   inhibiting movement of at least one of the tensioning assembly post and the termination assembly post in response to the signal.

21. The method of claim 1, wherein the tensioning assembly post and the termination assembly post remain parallel or substantially parallel during at least a portion of the movement of the tensioning assembly post and the termination assembly post.

22. The method of claim 1, further comprising enclosing the termination assembly post in a housing having a height smaller than a maximum vertical range of motion of a distal end of the tensioning assembly post.

23. The method of claim 1, further comprising enclosing the tensioning assembly post in a housing having a height smaller than a maximum vertical range of motion of a distal end of the tensioning assembly post.

* * * * *